US012771490B2

(12) United States Patent
Hosseini et al.

(10) Patent No.: US 12,771,490 B2
(45) Date of Patent: Oct. 20, 2026

(54) FEEDBACK ENHANCEMENTS FOR MULTI-CARRIER OPERATION

(71) Applicant: QUALCOMM Incorporated, San Diego, CA (US)

(72) Inventors: Kianoush Hosseini, San Diego, CA (US); Aleksandar Damnjanovic, Del Mar, CA (US); Umesh Phuyal, San Diego, CA (US); Kazuki Takeda, Minato-ku (JP)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 18/610,955

(22) Filed: Mar. 20, 2024

(65) Prior Publication Data

US 2025/0300772 A1 Sep. 25, 2025

(51) Int. Cl.
*H04L 1/1829* (2023.01)
*H04L 1/1812* (2023.01)

(52) U.S. Cl.
CPC .......... *H04L 1/1864* (2013.01); *H04L 1/1816* (2013.01)

(58) Field of Classification Search
CPC ............................ H04L 1/1864; H04L 1/1816
See application file for complete search history.

(56) References Cited

U.S. PATENT DOCUMENTS

2011/0116530 A1* 5/2011 Sambhwani .......... H04L 1/1854 370/310
2013/0039327 A1* 2/2013 Gao ...................... H04L 5/0096 370/329
2017/0346605 A1* 11/2017 Chendamarai Kannan ................. H04L 1/1874
2018/0176939 A1* 6/2018 Guan .................... H04L 5/0082
2018/0352471 A1* 12/2018 Benammar ........... H04L 1/1887
2021/0314810 A1* 10/2021 Kanamarlapudi .... H04L 1/1671
2022/0201726 A1 6/2022 Papasakellariou

OTHER PUBLICATIONS

International Search Report and Written Opinion—PCT/US2025/018704—ISA/EPO—May 26, 2025.

(Continued)

*Primary Examiner* — Derrick W Ferris
(74) *Attorney, Agent, or Firm* — Holland & Hart LLP/QUALCOMM Incorporated

(57) ABSTRACT

Methods, systems, and devices for wireless communication are described. A user equipment (UE) may receive an indication of a first set of downlink carriers and a second set of downlink carriers including multiple subsets. The UE may receive a message from a network entity via a first subset, and may transmit a feedback message to a second network entity via an anchor carrier of the first set for relaying to the network entity. The UE may also receive one or more second messages via a second subset, and may apply a second feedback scheme, where a feedback process duration associated with the second feedback scheme may be less than that of the first feedback scheme. Applying the second feedback scheme may involve monitoring for one or more retransmissions of the second message, or transmitting one or more feedback messages via an anchor carrier of the second set.

18 Claims, 18 Drawing Sheets

(56) References Cited

OTHER PUBLICATIONS

Lenovo: "Discussion on Multi-cell Scheduling via a Single DCI", 3GPPTSG RAN WG1 #110, R1-2206451, 3rd Generation Partnership Project (3GPP), Mobile Competence Centre, 650, Route Des Lucioles, F-06921 Sophia-Antipolis Cedex, France, vol. RAN WG1, No. Toulouse, France; Aug. 22, 2022-Aug. 26, 2022, Aug. 12, 2022, 15 Pages, XP052274383, p. 9.

LG Electronics: "HARQ procedure for NR-U", 3GPP TSG RAN WG1 #98bis, R1-1910821, NR-U HARQFINAL, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019,22 Pages, XP051809211, p. 10.

Samsung: "Feature Lead Summary for MU-MIMO CSI", 3GPP TSG RAN WG1 99, R1-1912480, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 18, 2019-Nov. 22, 2019, Nov. 19, 2019, 15 Pages, XP051826598, p. 10.

* cited by examiner

FEEDBACK ENHANCEMENTS FOR MULTI-CARRIER OPERATION

FIELD OF TECHNOLOGY

The following relates to wireless communication, including feedback enhancements for multi-carrier operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support feedback enhancements for multi-carrier operation. For example, the described techniques provide for increased throughput for multiple carrier feedback in both carrier aggregation (CA) and dual connectivity (DC) communications by designating different groups and subgroups of carriers with separate (e.g., different, independent) feedback schemes. For example, a network may configure a first group of component carriers (CCs) in a low band (LB) spectrum and a second group of CCs in a high band (HB) spectrum (or vice versa). Feedback in the first group may involve transmitting feedback messages to a network entity (e.g., a distributed unit (DU)) for forwarding to another network entity from which related downlink messaging was received. Feedback in the second group may instead be dependent on one or more subgroups. For example, the second group may be split into a first subgroup using a same scheme as the first group in LB, a second subgroup using feedback-less downlink transmissions, and a third subgroup using feedback-based retransmissions sent via an anchor carrier of the second group of CCs (e.g., HB anchor carrier in one example, LB anchor carrier in another example, or another carrier for another grouping configuration). By using a combination of the first, second, and third subgroups, throughput may be improved by freeing up one or more feedback processes while mitigating overhead cost.

A method for wireless communications by a user equipment (UE) is described. The method may include receiving an indication of a first set of one or more downlink carriers and a second set of one or more downlink carriers, where the indication further indicates a set of multiple subsets of one or more downlink carriers that are each within the second set of one or more downlink carriers, receiving a first message via a first subset of the set of multiple subsets of one or more downlink carriers, applying a first feedback scheme for feedback associated with the first message, where the first feedback scheme is applied based on the first message being received via the first subset, receiving a second message via a second subset of the set of multiple subsets of one or more downlink carriers, and applying a second feedback scheme for feedback associated with the second message, where the second feedback scheme is applied based on the second message being received via the second subset, and where the second feedback scheme is different from the first feedback scheme.

A UE for wireless communications is described. The UE may include one or more memories storing processor executable code, and one or more processors coupled with the one or more memories. The one or more processors may individually or collectively be operable to execute the code to cause the UE to receive an indication of a first set of one or more downlink carriers and a second set of one or more downlink carriers, where the indication further indicates a set of multiple subsets of one or more downlink carriers that are each within the second set of one or more downlink carriers, receive a first message via a first subset of the set of multiple subsets of one or more downlink carriers, apply a first feedback scheme for feedback associated with the first message, where the first feedback scheme is applied based on the first message being received via the first subset, receive a second message via a second subset of the set of multiple subsets of one or more downlink carriers, and apply a second feedback scheme for feedback associated with the second message, where the second feedback scheme is applied based on the second message being received via the second subset, and where the second feedback scheme is different from the first feedback scheme.

Another UE for wireless communications is described. The UE may include means for receiving an indication of a first set of one or more downlink carriers and a second set of one or more downlink carriers, where the indication further indicates a set of multiple subsets of one or more downlink carriers that are each within the second set of one or more downlink carriers, means for receiving a first message via a first subset of the set of multiple subsets of one or more downlink carriers, means for applying a first feedback scheme for feedback associated with the first message, where the first feedback scheme is applied based on the first message being received via the first subset, means for receiving a second message via a second subset of the set of multiple subsets of one or more downlink carriers, and means for applying a second feedback scheme for feedback associated with the second message, where the second feedback scheme is applied based on the second message being received via the second subset, and where the second feedback scheme is different from the first feedback scheme.

A non-transitory computer-readable medium storing code for wireless communications is described. The code may include instructions executable by one or more processors to receive an indication of a first set of one or more downlink carriers and a second set of one or more downlink carriers, where the indication further indicates a set of multiple subsets of one or more downlink carriers that are each within the second set of one or more downlink carriers, receive a first message via a first subset of the set of multiple subsets of one or more downlink carriers, apply a first feedback scheme for feedback associated with the first message, where the first feedback scheme is applied based on the first message being received via the first subset, receive a second message via a second subset of the set of multiple subsets of one or more downlink carriers, and apply a second feedback scheme for feedback associated with the second message, where the second feedback scheme is applied based on the second message being received via the second subset, and where the second feedback scheme is different from the first feedback scheme.

In some examples of the method, user equipment (UEs), and non-transitory computer-readable medium described herein, a feedback process duration associated with the second feedback scheme may be less than a corresponding duration associated with the first feedback scheme.

In some examples of the method, user equipment (UEs), and non-transitory computer-readable medium described herein, applying the first feedback scheme may include operations, features, means, or instructions for transmitting a feedback message indicating feedback associated with the first message, where the indication, the first message, and the second message may be received from a first network entity, and where the feedback message may be transmitted to a second network different from the first network entity.

In some examples of the method, user equipment (UEs), and non-transitory computer-readable medium described herein, the feedback message indicates feedback associated with one or more additional messages received via the first subset of the set of multiple subsets of one or more downlink carriers and may be transmitted based on receiving a trigger message.

In some examples of the method, user equipment (UEs), and non-transitory computer-readable medium described herein, the feedback message may be transmitted via an anchor carrier associated with the first set of one or more downlink carriers.

In some examples of the method, user equipment (UEs), and non-transitory computer-readable medium described herein, the feedback message indicates feedback associated with a set of multiple retransmissions of the first message.

In some examples of the method, user equipment (UEs), and non-transitory computer-readable medium described herein, the feedback message includes one or more cyclic redundancy check (CRC) bits.

In some examples of the method, user equipment (UEs), and non-transitory computer-readable medium described herein, the feedback message indicates an identifier of the first network entity from which the first message may be received.

In some examples of the method, user equipment (UEs), and non-transitory computer-readable medium described herein, one or more radio link control (RLC) retransmissions may be disabled.

Some examples of the method, user equipment (UEs), and non-transitory computer-readable medium described herein may further include operations, features, means, or instructions for combining one or more log-likelihood ratio values associated with one or more retransmissions of the first message.

In some examples of the method, user equipment (UEs), and non-transitory computer-readable medium described herein, applying the second feedback scheme may include operations, features, means, or instructions for monitoring the second subset of the set of multiple subsets of one or more downlink carriers for one or more additional messages, where the one or more additional messages include one or more retransmissions of the second message, where the one or more retransmissions may be due, at least in part, to an absence of feedback reporting in the second feedback scheme.

In some examples of the method, user equipment (UEs), and non-transitory computer-readable medium described herein, applying the second feedback scheme may include operations, features, means, or instructions for transmitting a feedback message indicating feedback associated with the second message and transmitting one or more additional feedback messages indicating the feedback associated with the second message, where the one or more additional feedback messages include one or more retransmissions of the feedback message.

In some examples of the method, user equipment (UEs), and non-transitory computer-readable medium described herein, the feedback message and the one or more additional feedback messages may be transmitted via an anchor carrier associated with the second set of one or more downlink carriers.

In some examples of the method, user equipment (UEs), and non-transitory computer-readable medium described herein, applying the first feedback scheme and the second feedback scheme may include operations, features, means, or instructions for transmitting one or more first feedback messages indicating feedback associated with the first message, where the one or more first feedback messages may be transmitted via an anchor carrier associated with the first set of one or more downlink carriers and in accordance with a first codebook and the first feedback scheme and transmitting one or more second feedback messages indicating feedback associated with the second message, where the one or more second feedback messages may be transmitted via an anchor carrier associated with the second set of one or more downlink carriers and in accordance with a second codebook and the second feedback scheme.

Some examples of the method, user equipment (UEs), and non-transitory computer-readable medium described herein may further include operations, features, means, or instructions for transmitting an RLC status indicator associated with the first set, the first subset, the second subset, or any combination thereof.

In some examples of the method, user equipment (UEs), and non-transitory computer-readable medium described herein, the first feedback scheme may be applied for feedback that pertains to messages received via the first set of one or more downlink carriers.

In some examples of the method, user equipment (UEs), and non-transitory computer-readable medium described herein, the first set of one or more downlink carriers and the second set of one or more downlink carriers may be grouped based on a respective cell group, a respective uplink control channel group, one or more respective frequency bands, one or more respective subcarrier spacings, one or more respective bandwidths, one or more respective processing timelines, or any combination thereof, of each downlink carrier of the first set and the second set.

In some examples of the method, user equipment (UEs), and non-transitory computer-readable medium described herein, the first subset within the second set of one or more downlink carriers and the second subset within the second set of one or more downlink carriers may be grouped based on a respective cell index, a respective feedback process identifier, a respective logical channel, a respective logical channel group, or any combination thereof, of each downlink carrier of the first set and the second set.

A method for wireless communications by a network entity is described. The method may include outputting an indication of a first set of one or more downlink carriers and a second set of one or more downlink carriers, where the indication further indicates a set of multiple subsets of one or more downlink carriers that are each within the second set of one or more downlink carriers, outputting a first message via a first subset of the set of multiple subsets of one or more downlink carriers in accordance with a first feedback scheme for feedback associated with the first message, and outputting a second message via a second subset of the set of multiple subsets of one or more downlink carriers in accordance with a second feedback scheme for feedback associated with the second message, where the second feedback scheme is different from the first feedback scheme.

A network entity for wireless communications is described. The network entity may include one or more memories storing processor executable code, and one or more processors coupled with the one or more memories. The one or more processors may individually or collectively be operable to execute the code to cause the network entity to output an indication of a first set of one or more downlink carriers and a second set of one or more downlink carriers, where the indication further indicates a set of multiple subsets of one or more downlink carriers that are each within the second set of one or more downlink carriers, output a first message via a first subset of the set of multiple subsets of one or more downlink carriers in accordance with a first feedback scheme for feedback associated with the first message, and output a second message via a second subset of the set of multiple subsets of one or more downlink carriers in accordance with a second feedback scheme for feedback associated with the second message, where the second feedback scheme is different from the first feedback scheme.

Another network entity for wireless communications is described. The network entity may include means for outputting an indication of a first set of one or more downlink carriers and a second set of one or more downlink carriers, where the indication further indicates a set of multiple subsets of one or more downlink carriers that are each within the second set of one or more downlink carriers, means for outputting a first message via a first subset of the set of multiple subsets of one or more downlink carriers in accordance with a first feedback scheme for feedback associated with the first message, and means for outputting a second message via a second subset of the set of multiple subsets of one or more downlink carriers in accordance with a second feedback scheme for feedback associated with the second message, where the second feedback scheme is different from the first feedback scheme.

A non-transitory computer-readable medium storing code for wireless communications is described. The code may include instructions executable by one or more processors to output an indication of a first set of one or more downlink carriers and a second set of one or more downlink carriers, where the indication further indicates a set of multiple subsets of one or more downlink carriers that are each within the second set of one or more downlink carriers, output a first message via a first subset of the set of multiple subsets of one or more downlink carriers in accordance with a first feedback scheme for feedback associated with the first message, and output a second message via a second subset of the set of multiple subsets of one or more downlink carriers in accordance with a second feedback scheme for feedback associated with the second message, where the second feedback scheme is different from the first feedback scheme.

In some examples of the method, network entities, and non-transitory computer-readable medium described herein, a feedback process duration associated with the second feedback scheme may be less than a corresponding duration associated with the first feedback scheme.

Some examples of the method, network entities, and non-transitory computer-readable medium described herein may further include operations, features, means, or instructions for obtaining, based on the first feedback scheme, a feedback message indicating feedback associated with the first message, where the feedback message may be obtained from a second network entity different from the network entity.

In some examples of the method, network entities, and non-transitory computer-readable medium described herein, the feedback message indicates feedback associated with one or more additional messages output via the first subset of the set of multiple subsets of one or more downlink carriers and may be obtained based on outputting a trigger message.

In some examples of the method, network entities, and non-transitory computer-readable medium described herein, the feedback message indicates feedback associated with a set of multiple retransmissions of the first message.

In some examples of the method, network entities, and non-transitory computer-readable medium described herein, the feedback message includes one or more CRC bits.

In some examples of the method, network entities, and non-transitory computer-readable medium described herein, the feedback message indicates an identifier of the network entity.

In some examples of the method, network entities, and non-transitory computer-readable medium described herein, one or more RLC retransmissions may be disabled.

Some examples of the method, network entities, and non-transitory computer-readable medium described herein may further include operations, features, means, or instructions for outputting, based on the second feedback scheme, one or more additional messages via the second subset of the set of multiple subsets of one or more downlink carriers, where the one or more additional messages include one or more retransmissions of the second message, where the one or more retransmissions may be due, at least in part, to an absence of feedback reporting in the second feedback scheme.

Some examples of the method, network entities, and non-transitory computer-readable medium described herein may further include operations, features, means, or instructions for obtaining a feedback message indicating feedback associated with the second message and obtaining one or more additional feedback messages indicating the feedback associated with the second message, where the one or more additional feedback messages include one or more retransmissions of the feedback message.

Some examples of the method, network entities, and non-transitory computer-readable medium described herein may further include operations, features, means, or instructions for obtaining one or more first feedback messages indicating feedback associated with the first message, where the one or more first feedback messages may be associated with a first codebook and may be obtained in accordance with the first feedback scheme and obtaining one or more second feedback messages indicating feedback associated with the second message, where the one or more second feedback messages may be associated with a second codebook and may be obtained in accordance with the second feedback scheme.

Some examples of the method, network entities, and non-transitory computer-readable medium described herein may further include operations, features, means, or instructions for obtaining an RLC status indicator associated with the first set, the first subset, the second subset, or any combination thereof.

In some examples of the method, network entities, and non-transitory computer-readable medium described herein, the first feedback scheme may be applied for feedback that pertains to messages output via the first set of one or more downlink carriers.

In some examples of the method, network entities, and non-transitory computer-readable medium described herein, the first set of one or more downlink carriers and the second set of one or more downlink carriers may be grouped based on a respective cell group, a respective uplink control channel group, one or more respective frequency bands, one or more respective subcarrier spacings, one or more respective bandwidths, one or more respective processing timelines, or any combination thereof, of each downlink carrier of the first set and the second set.

In some examples of the method, network entities, and non-transitory computer-readable medium described herein, the first subset within the second set of one or more downlink carriers and the second subset within the second set of one or more downlink carriers may be grouped based on a respective cell index, a respective feedback process identifier, a respective logical channel, a respective logical channel group, or any combination thereof, of each downlink carrier of the first set and the second set.

DETAILED DESCRIPTION

Figure 1:
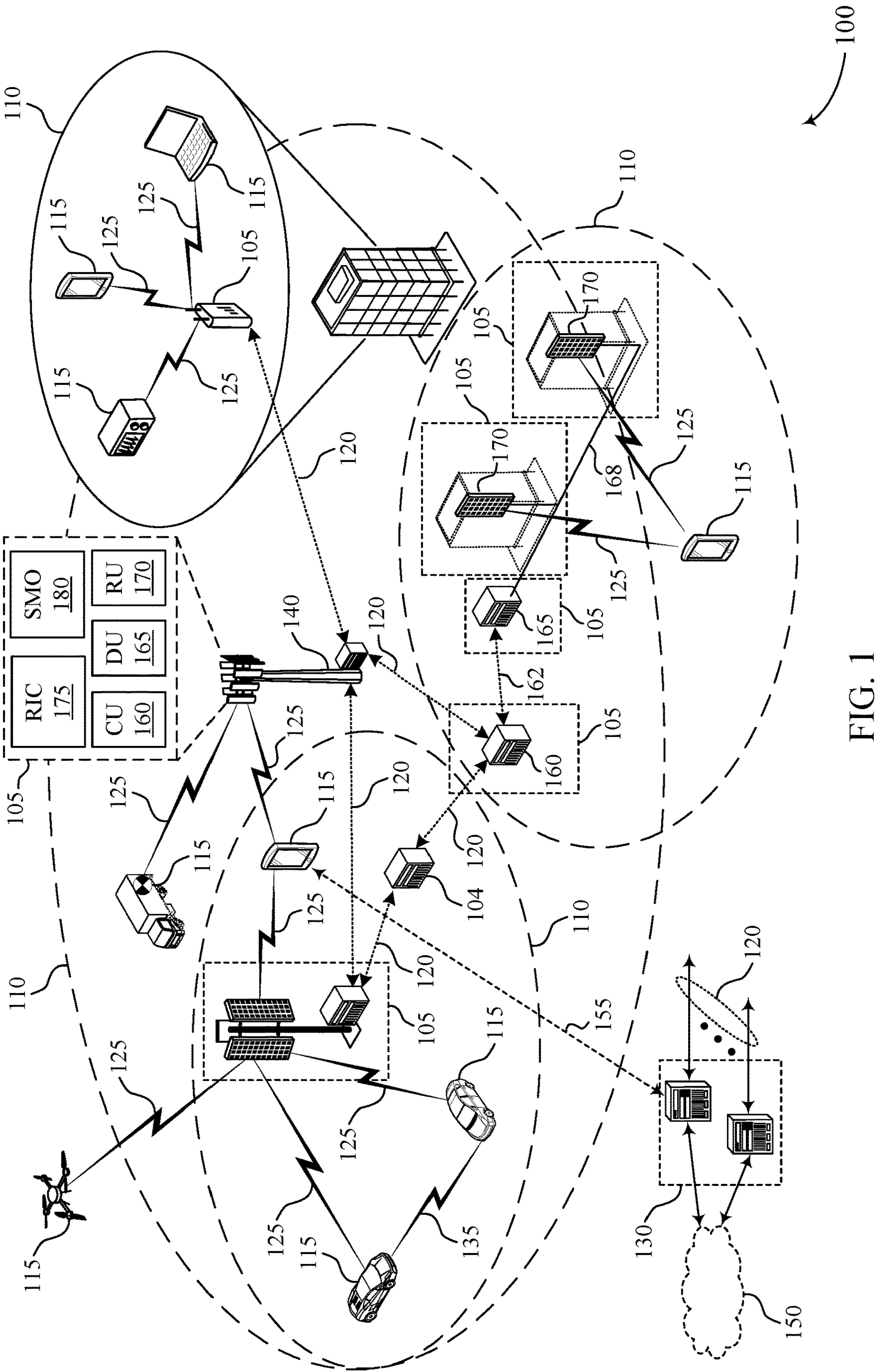
FIG. 1 shows an example of a wireless communications system that supports feedback enhancements for multi-carrier operation in accordance with one or more aspects of the present disclosure.

Some wireless communications systems may support carrier aggregation (CA) or dual connectivity (DC) between one or more devices. For example, carrier aggregation may involve communicating via multiple different component carriers (CCs) concurrently, while DC may involve communication with separate network entities at the same time. Multiple CCs in CA may thus be controlled by a single scheduler, such as a distributed unit (DU), or by coordinated schedulers (to avoid collision of resources), whereas DC may in some cases involve a scheduler or DU per cell group that acts independently. A user equipment (UE) may improve downlink throughput in a CA network by receiving downlink communications from a first DU via one or more high band (HB) CCs and transmitting related feedback via one or more low band (LB) CCs to a second DU, where the second DU may relay the feedback back to the first DU for scheduling. Dual connectivity networks may also involve similar relaying of feedback or other information. However, a latency of backhaul communications between DUs may delay a reception of feedback at a scheduling DU. Delays in feedback may cause gaps in scheduling or may be no longer be up to date once received, limiting throughput and reducing an efficiency in communications.

Techniques described herein enable increased throughput for multiple carrier feedback in both CA and DC communications by designating different groups and subgroups of CCs with separate (e.g., different, independent) feedback schemes. For example, a first network entity (e.g., a DU) may split one or more CCs into a first group in LB spectrum using LB anchor feedback signaling and a second group in HB spectrum with limited uplink feedback. The second group in HB may then be split into a first subgroup using a same scheme as the first group in LB, a second subgroup using feedback-less downlink transmissions, and a third subgroup using feedback-based retransmissions sent via an HB anchor CC. By using the second and third subgroups, throughput may be improved as the second subgroup may omit feedback and the third subgroup may transmit feedback directly to the first network entity to free up feedback processes. Further, by including a first subgroup using similar feedback as the first group, additional overhead introduced by the second and third subgroups may be mitigated. Decisions on how to organize each group and subgroup of CCs may be further based on packet importance, delay sensitivity, or other QoS considerations to improve a quality and efficiency of resource usage and communications.

Aspects of the disclosure are initially described in the context of wireless communications systems. Aspects of the disclosure are further illustrated by and described with reference to feedback configurations, wireless communications systems, and process flows that relate to feedback enhancements for multi-carrier operation. Aspects of the disclosure are further illustrated by and described with reference to apparatus diagrams, system diagrams, and flowcharts that relate to feedback enhancements for multi-carrier operation.

FIG. 1 shows an example of a wireless communications system 100 that supports feedback enhancements for multi-carrier operation in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node (s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined physical (PHY) layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using CA or multi-carrier operation. A UE 115 may be configured with multiple downlink CCs and one or more uplink CCs according to a CA configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a CA configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a CA configuration in conjunction with CCs operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, a radio resource control (RRC) layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 described herein may support increased throughput for multiple carrier feedback in CA and DC communications by designating different groups and subgroups of CCs with separate feedback schemes. For example, a first network entity 105 (e.g., a DU) may schedule communications at a UE 115 that may also be in communication with a second network entity 105. The first network entity 105 may split one or more configured CCs into a first group in LB spectrum involving LB anchor feedback signaling to the second network entity 105 and a second group in HB spectrum for downlink from the first network entity 105 with limited uplink feedback. The second group in HB may then be split into a first subgroup using a same feedback scheme as the first group in LB, a second subgroup using feedback-less (e.g., HARQ-less) downlink transmissions, and a third subgroup using feedback-based (e.g., HARQ-based) retransmissions sent via an HB anchor carrier. In some examples, decisions on how to organize each group and subgroup of CCs may be further based on packet importance, delay sensitivity, or other QoS considerations to improve a quality and efficiency of resource usage and communications.

Figure 2:
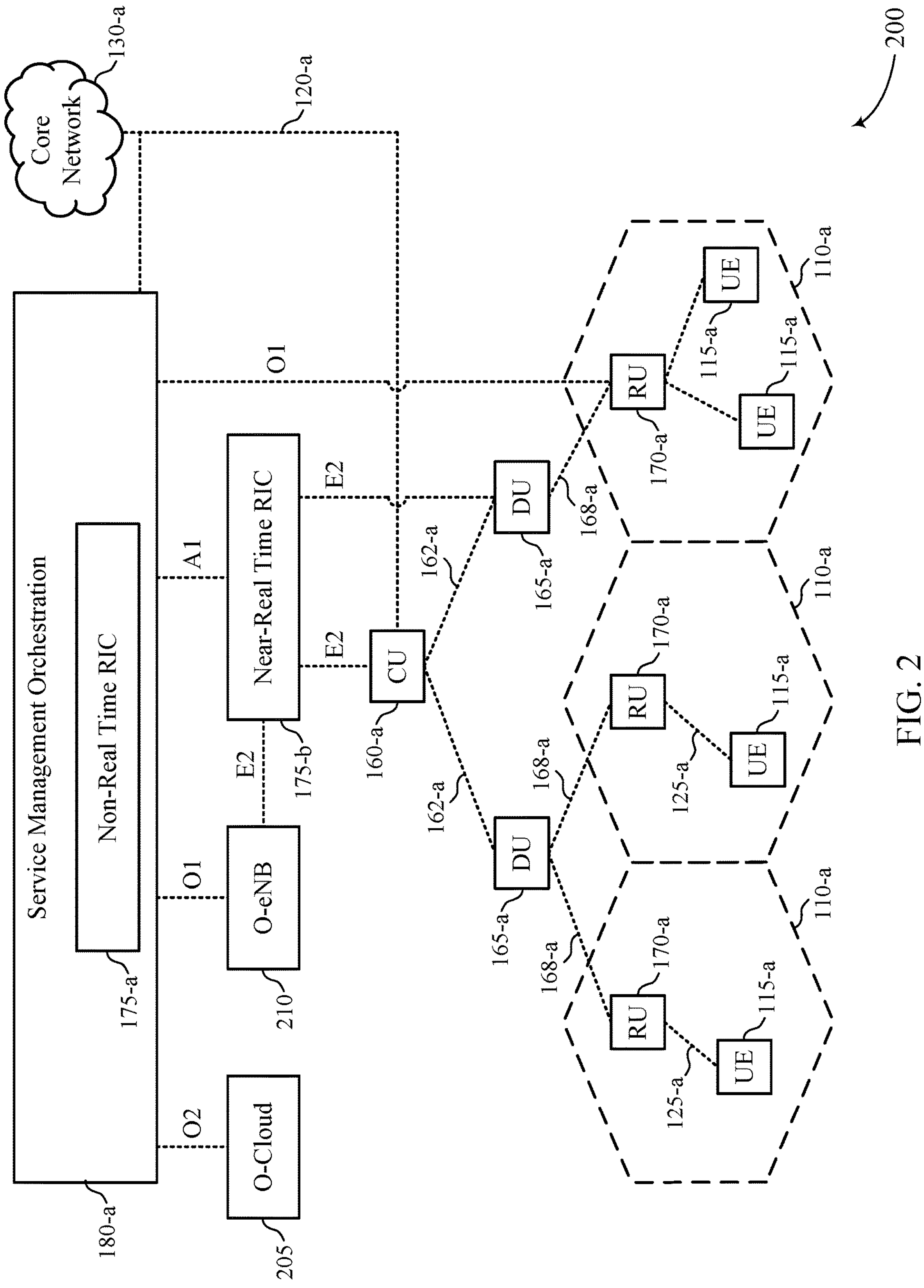
FIG. 2 shows an example of a network architecture that supports feedback enhancements for multi-carrier operation in accordance with one or more aspects of the present disclosure.

FIG. 2 shows an example of a network architecture 200 (e.g., a disaggregated base station architecture, a disaggregated RAN architecture) that supports feedback enhancements for multi-carrier operation in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by or communicate with multiple RUs 170-*a*, for example, in a CA configuration or in a DC configuration. A UE 115-*a* may also be simultaneously served by or communicate with multiple DUs 165-*a*, such as in a DC configuration.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

In some examples, the network architecture 200 described herein may support increased throughput for multiple carrier feedback in CA and DC communications by designating different groups and subgroups of CCs with separate feedback schemes. For example, a DU 165-*a* may schedule communications at a UE 115 that may also be in communication with a second DU 165-*a*. One or more configured CCs may be split into a first group in LB spectrum using LB anchor feedback signaling to the second DU 165-*a* for relaying to the first DU 165-*a*, and a second group in HB spectrum for downlink from the first DU 165-*a* with limited uplink feedback. The second group may then be split into a first subgroup using a same scheme as the first group in LB, a second subgroup using feedback-less downlink transmissions, and a third subgroup using feedback-based retransmissions sent via an HB anchor carrier.

Figure 3A:
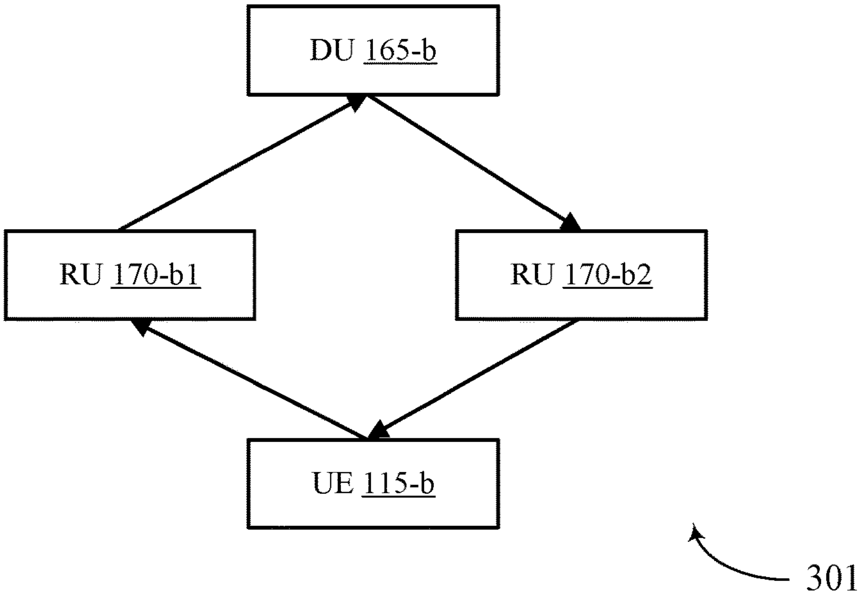
FIGS. 3A and 3B show examples of feedback configurations that support feedback enhancements for multi-carrier operation in accordance with one or more aspects of the present disclosure.
Figure 3B:
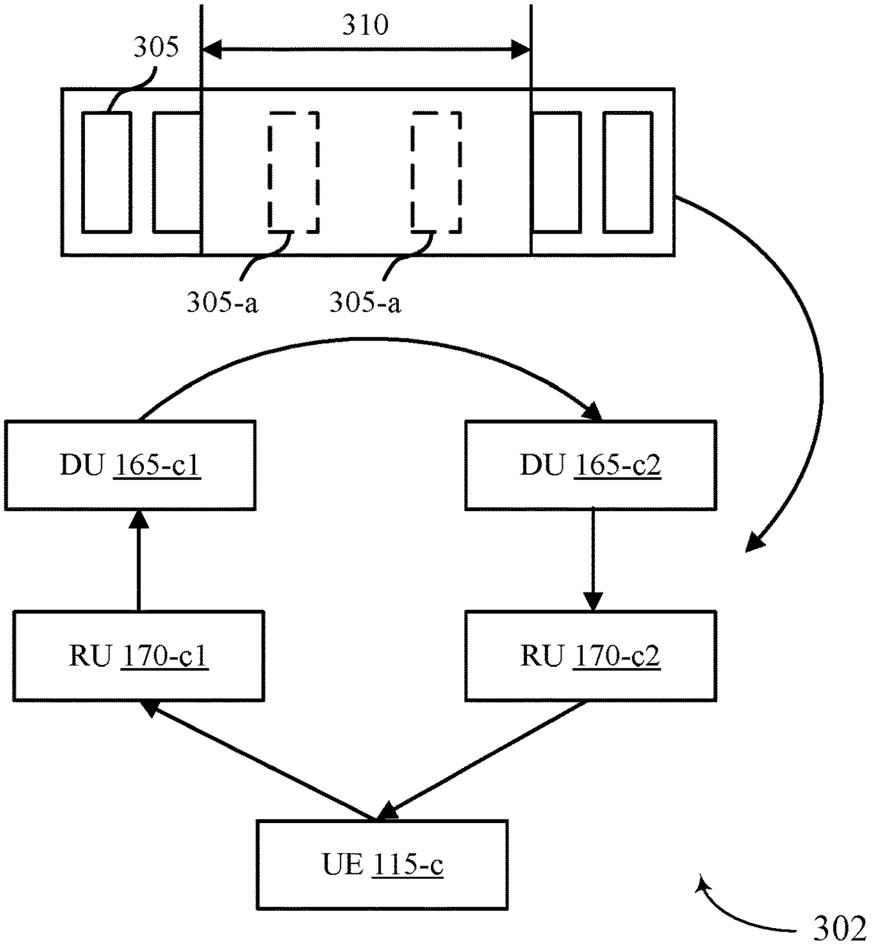

FIGS. 3A and 3B show examples of a feedback configuration 301 and a feedback configuration 302, respectively, that may support feedback enhancements for multi-carrier operation in accordance with one or more aspects of the present disclosure. In some examples, the feedback configurations 301 and 302 may implement or be implemented by aspects of the wireless communications system 100 and the network architecture 200. For example, the feedback configuration 301 of FIG. 3A may illustrate a UE 115-*b* in communication with one or more network entities 105 in a CA configuration, including a single DU 165-*b* and two RUs 170-*b*1 and 170-*b*2, which may represent UEs 115, network entities 105, DUs 165, and RUs 170 as described herein with respect to FIGS. 1 and 2. The feedback configuration 302 of FIG. 3B may illustrate a UE 115-*c* in communication with one or more network entities 105 in a DC configuration or a loosely configured CA configuration, including a DU

165-*c*1 and a corresponding RU 170-*c*1 as well as a DU 165-*c*2 and a corresponding RU 170-*c*2. In some examples, the network entities 105 and the UEs 115 may be configured with multiple groups and subgroups of CCs to mitigate lower throughput in communications.

In some examples, increasing throughput by aggregating multiple downlink and uplink CCs may be enabled and deployed at the UEs 115 and the network entities 105 by using CA, DC, or both, which may each present different advantages. For example, CA, as illustrated in FIG. 3A, may provide increased performance in comparison to DC as illustrated in FIG. 3B. As all aggregated carriers may controlled by a single scheduler (e.g., MAC entity) in CA, such as the DU 165-*b*, scheduling decisions may be informed by communications on multiple different CCs and with the different RUs 170, and so the DU 165-*b* may update scheduling to maintain throughput. In an example, CA may allow for transmitting feedback (e.g., downlink HARQ-ACK bits corresponding to one or more downlink messages) in uplink on a primary cell (PCell), which may have a higher signal power (e.g., reference signal receive power (RSRP)) and greater coverage compared to one or more secondary cells (SCells). However one or more of the cells may become limited in uplink coverage (e.g., when aggregating cells from LB and HB spectrum), and so may present a bottleneck to downlink throughput as the DU 165-*b* may wait on feedback before scheduling additional downlink messages. The DU 165-*b* may be aware of this bottleneck, and may adjust aggregation of cells to extend the coverage of uplink feedback and maintain throughput.

In DC however, there may a scheduler per cell group, such as the DU 165-*c*1 for a first cell group and the DU 165-*c*2 for a second cell group, which may each act independently. Further, the feedback of each cell group may be transmitted on a special cell (sPCell) of a same cell group. As a result, if an sPCell is from an HB spectrum, such as in SCG, downlink throughput may be limited by uplink coverage if the coverage of the HB spectrum is low. However, as the DUs 165-*c*1 and 165-*c*2 may be unaware of scheduling or communications at one another, they may be unable to reschedule transmissions in case of collision or overcome a bottleneck in the uplink. Thus, CA may achieve greater throughput than DC in both downlink and uplink communications.

DC may allow for adopting more flexible deployment options in comparison to CA, as illustrated in FIG. 3B. For example, DC in FIG. 3B may allow for more flexible network planning, architecture and deployment by enabling independent operation of schedulers, such as the DUs 165-*c*1 and 165-*c*2, while the CA in FIG. 3A may be limited in deployment and architecture options due to using a single DU 165-*b* to control CCs. Although CA may in some cases physically or virtually separate one or more DUs (e.g., as illustrated in FIG. 3B), the DUs 165 may utilize tight coordination to enable transparent scheduling, which may not be possible in some environments or configurations. For example, tight coordination between DUs 165 may be unlikely to be achieved in non-collocated types of deployments due to latency involved with backhaul communication links between DUs 165, such as in non-collocated networks involving cells supporting LB spectrum with densified cells for supporting HB spectrum. Coordination may also be challenging in both co-located or non-collocated deployments with different RAN disaggregation options. For example, in networks supporting FR1 and FR2 CA, each frequency range may be disaggregated differently, where FR1 may be associated with components of one functionality and location while FR2 may have an integrated RU and DU with another functionality. DC however may not involve coordination, and so non-collocated configurations and differences in disaggregation may be supported.

In some examples, CA with loose coordination across DUs may be supported. For example, CA with loose coordination between the DUs 165-*c*1 and 165-*c*2 of FIG. 3B may involve utilizing an LB anchor carrier for carrying feedback to sustain high downlink throughputs when CCs from different bands are aggregated, such as CCs from HB spectrum with wide bandwidth. For example, the UE 115-*c* may receive scheduled downlink messaging (e.g., transport blocks, PDSCH messages) on one or more downlink cells in an HB spectrum from the DU 165-*c*2 via the RU 170-*c*2 (e.g., an HB RU), and may transmit feedback (e.g., HARQ-ACK) in uplink to the DU 165-*c*1 via the RU 170-*c*1 (e.g., an LB RU) on one or more downlink cells of a LB anchor carrier.

In some cases, for feedback associated with downlink cells under the control of one DU 165 on a cell (e.g., LB coverage anchor) which is under the control of another DU 165, tighter coordination may be possible at a scheduling timing granularity so that resources do not collide. For example, one or more resources of an anchor cell of a first group of CCs (e.g., LB spectrum) of the RU 170-*c*1 and DU 165-*c*1 may be reserved semi-statically (or dynamically) for uplink transmission of feedback for downlink messages received via a second group of CCs (e.g., HB spectrum) from the RU 170-*c*2 and the DU 165-*c*2. Thus, these resources may be assumed as unavailable for uplink associated with the first group of CCs. One or more resources may also be reserved in downlink (e.g., for performing measurements). Semi-static resource reservation may relax an amount of dynamic coordination performed between the DUs 165 to enable tight coordination with less signaling.

However, even if one or more DUs 165 are dynamically or semi-statically coordinated, feedback may incur latency due to backhaul communications between the DUs 165-*c*1 and 165-*c*2. For example, feedback for the messages 305 from the DU 165-*c*2 received via the second group of CCs may be sent to the DU 165-*c*1 via an anchor cell of the first group of CCs, which may then transfer the feedback to the DU 165-*c*2 controlling the second group of CCs to be used for making scheduling decisions. Given that backhaul capacity may be limited, a delay 310 may be incurred before more transmissions are scheduled. For example, after scheduling one or more messages 305 (e.g., PDSCH messages), the DU 165-*c*2 may wait until receiving associated feedback before transmitting one or more additional messages 305, or before sending retransmissions if needed based on the feedback. Further, in some cases, the information of the feedback may be "stale" (e.g., old, not up to date) once received by the DU 165-*c*2, and may no longer be relevant or useful. For example, by the time the DU 165-*c*2 receives the feedback, one or more RLC retransmissions may have already been triggered for transmission, which may render the availability of the feedback information useless.

Techniques described herein may enable increased throughput for multiple carrier feedback in both CA and DC communications by designating different groups and subgroups of CCs with separate feedback schemes. For example, the DU 165-*c*2 (or another related network entity) may configure one or more CCs in a first group in LB spectrum using an LB anchor carrier of the DU 165-*c*1 for feedback signaling via the DU 165-*c*1. The DU 165-*c*2 may also configure a second group in HB spectrum with limited uplink feedback, where the second group may be split into multiple subgroups to fill in one or more gaps in transmissions. For example, the second group in HB may be split into a first subgroup using a same scheme as the first group in LB, a second subgroup using HARQ-less downlink transmissions, and a third subgroup using HARQ-based retransmissions sent via an HB anchor carrier. Notably, the HARQ-less downlink transmissions may enable the DU 165-*c*2 to schedule new messages 305-*a* after transmission of one or more messages 305, while the third subgroup may free up HARQ processes by transmitting directly to the DU 165-*c*2 (e.g., via the RU 170-*c*2) via the HB band to mitigate the delay 310. Thus, one or more messages 305-*a* may be scheduled during within the delay 310 to mitigate and reduce the effect of the backhaul latency, which may increase a throughput (e.g., in downlink). Using the first subgroup may also reduce an amount of overhead in communications. Further, although some examples may involve a first group in LB spectrum and a second group in HB spectrum, the grouping may be done according to any configuration (e.g., first group in HB spectrum, second group in LB spectrum, or another grouping).

Figure 4:
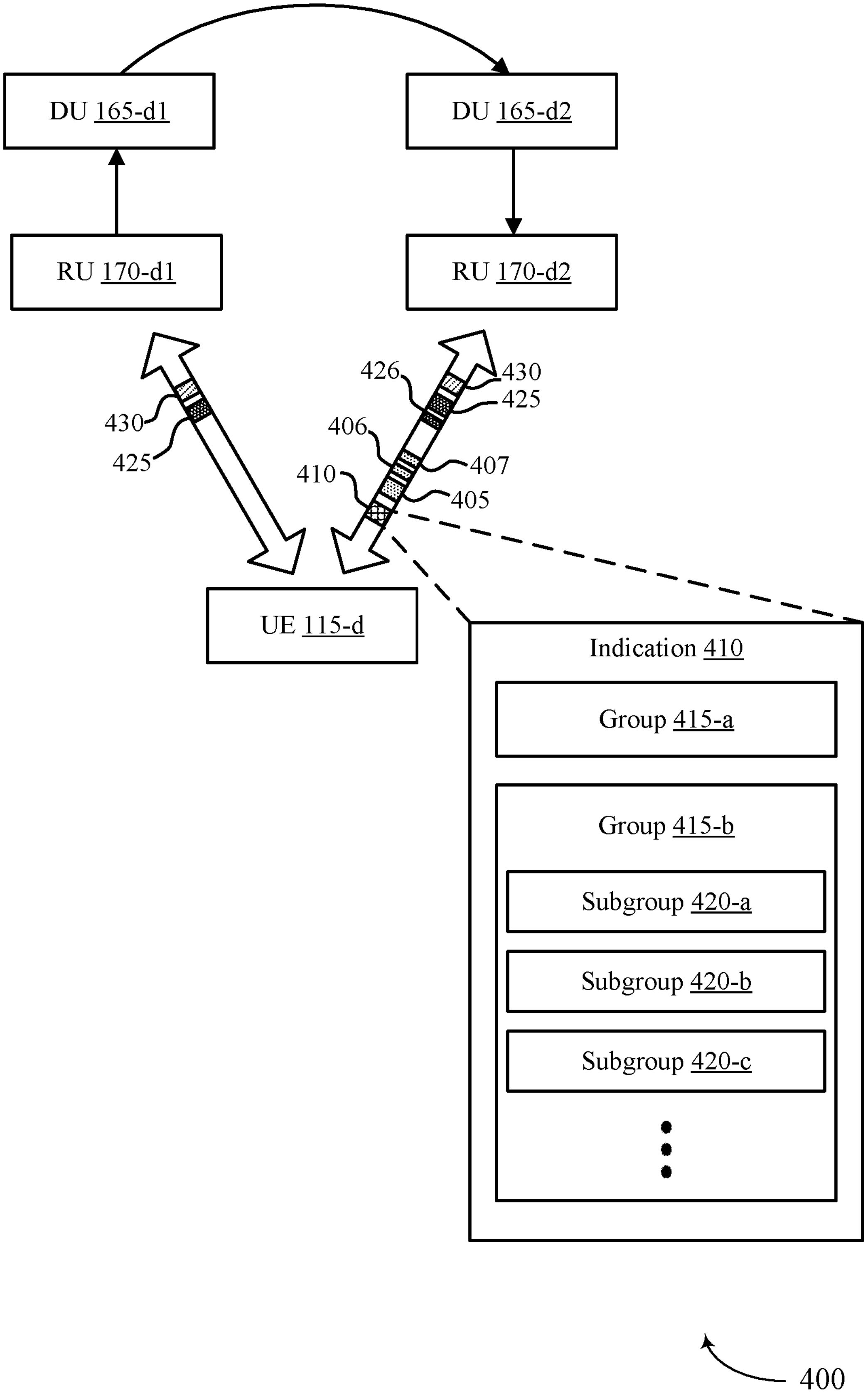
FIG. 4 shows an example of a wireless communications system that supports feedback enhancements for multi-carrier operation in accordance with one or more aspects of the present disclosure.

FIG. 4 shows an example of a wireless communications system 400 that supports feedback enhancements for multi-carrier operation in accordance with one or more aspects of the present disclosure. In some examples, the wireless communications system 400 may implement or be implemented by aspects of the wireless communications system 100, the network architecture 200, and the feedback configurations 301 and 302. For example, the wireless communications system 400 may include a UE 115-*d* that may be in communication with one or more network entities 105, including with a DU 165-*d*1 and a DU 165-*d*2 via an RU 170-*d*1 and an RU 170-*d*2, respectively. The wireless communications system 400 may involve a DC configuration with no coordination between the DUs 165 or a loosely-coordinated CA configuration as described herein. In some cases, the network entities 105 and the UEs 115 may support subsets of CCs with separate feedback schemes and additional signaling to increase a downlink throughput for one or more messages 405.

For example, the DU 165-*d*2 may transmit an indication 410 to the UE 115-*d* (e.g., an RRC message or other configuration message) that may indicate different groupings of CCs for use in uplink communications. For example, a network entity 105 (e.g., a CU 160, the DU 165-*d*2) of the wireless communications system 400 may first group aggregated downlink CCs into a first group and a second group, including a group 415-*a* and a group 415-*b*, respectively. In some cases, the grouping may be based on whether one or more CCs are in a master cell group (MCG) or secondary cell group (SCG) or based on whether CCs are in a primary physical uplink control channel (PUCCH) group or a secondary PUCCH group for CA with multiple PUCCH groups. The grouping may also be based on related frequency bands, based on whether CCs are in FR1 or FR2, related subcarrier spacings, available bandwidths, configured processing timelines, among other RF or baseband parameters. Each of the groups 415-*a* and 415-*b* may have an anchor uplink cell for carrying uplink messaging, (e.g., HARQ-ACK feedback), uplink control information (UCI), RLC status packet data units (PDUs), among other uplink signaling. In DC, an anchor for MCG may be a PCell and for SCG may be a Pscell, while in CA with multiple PUCCH groups, each group 415 may have a CC for carrying PUCCH and UL control information. Further, in CA with a single PUCCH group, the anchor for each group 415 may be identical, and may be a PCell. Further, although the examples described herein may describe two groups 415, CCs may be grouped into any quantity of groups 415 based on similar or different factors.

In some examples, the group 415-*a* may be defined as CCs, for example, within an LB spectrum, while the group 415-*b* may include CCs, for example, within an HB spectrum with limited uplink coverage as described with respect to FIGS. 3A and 3B. For downlink CCs in the group 415-*a*, uplink feedback may be provided without one or more changes. For example, HARQ-ACK feedback may be provided for each message 405 (e.g., transport block) depending on a type of HARQ codebook configured. Further, UCI may be provided in a static, semi-persistent, or dynamic manner, and RLC status PDUs may be sent for logical channels configured with RLC acknowledge mode (AM) when requested or based on timer expiration.

In some cases, downlink transmissions on the group 415-*b* of downlink CCs may further be split into multiple sub-groups 420. For example, the group 415-*b* may be split into subgroups 420-*a*, 420-*b*, and 420-*c*, among other subgroups for any quantity of subgroups. In some cases, the subgrouping may be based on a priority of related messages 405 (e.g., packets, such as transport blocks or PDSCHs), which messages 405 are delay sensitive, or other quality of service (QOS) factors. Grouping of the subgroups 420 may also be based on a related cell index, HARQ process ID per cell, general HARQ process IDs if IDs are pooled together across CCs, logical channels, logical channel groups, as well as the factors mentioned earlier for grouping the groups 415. Once a decision on groupings of CCs is made, the UE 115-*a* may be notified via the indication 410 on how to form each subgroup and how to transmit feedback associated with each subgroup.

In some examples, uplink feedback schemes for each subgroup 420 may be separate, and may include one or more different signaling procedures. For example, for the subgroup 420-*a*, the UE 115-*d* may transmit a feedback message 425 (e.g., a feedback report) via the LB anchor carrier using a similar configuration as the group 415-*a*. The feedback message 425 may be sent on an uplink cell associated with the group 415-*a* of downlink CCs (e.g., via an LB PCell). In some cases, the UE 115-*e* may keep one or more HARQ-ACK bits associated with one or more messages 405, which may not be transmitted until a group-HARQ feedback is triggered. Notably, the UE 115-*d* may aggregate and transmit feedback for a set of messages 405 associated with the given subgroup 420-*a*, or that is, received via one or more CCs of the subgroup 420-*a*. In some examples, the HARQ-ACK bits may be grouped (e.g., multiplexed) for transmission together via the feedback message 425, or may be bundled, where a single bit may be transmitted to indicate feedback for the whole set of messages 405 (e.g., a single NACK if any message 405 is missed or incorrectly decoded). Further, the UE 115-*d* may support HARQ codebooks (e.g., Type-3) for a configurable subset of logical channels or HARQ IDs (e.g., instead of sending all HARQ-feedback bits in one-shot, a subset of bits may be reported). In some examples, the triggering may be based on L1 or L2 signaling, while the feedback report may be carried by L1 and L2 signaling (e.g., MAC-CE) and transmitted on a PUCCH or a physical uplink shared channel (PUSCH).

In some cases, a payload of the feedback message 425 may protected by CRC for robustness. When feedback is triggered, if a size of the feedback message 425 payload is small (e.g., less than a threshold) for adding CRC, payload padding may be performed and CRC bits may be added. The group 415-*b* of CCs may in some cases be associated with (e.g., controlled by) different DUs 165. For example, one or more CCs under SCG may be controlled by multiple non-coordinated or loosely coordinated DUs 165. In such a case, the feedback message 425 may include an identification (e.g., an address) for reported feedback bits that may be used by the DU 165-*d*1 to transfer feedback over a network backhaul link to one or more corresponding DUs (e.g., the DU 165-*d*2, one or more other DUs 165). In some cases, for RLC segments or messages 405 (e.g., transport blocks) associated with the subgroup 420-*a*, RLC retransmission may be disabled. Additionally, or alternatively, relatively large RLC retransmission timers may be configured to accommodate for additional latency of the backhaul link between the DU 165-*d*1 and the DU 165-*d*2 or other DUs 165.

In some examples, downlink transmissions may be with repetitions (blind retransmission) and when a feedback message 425 is triggered, the UE 115-*d* may send feedback (e.g., ACK/NACK) based on combining across received PDSCHs for a given HARQ process ID. In some examples, in place of performing RLC retransmission (or performing RLC retransmission without additional feedback schemes), the UE 115-*d* may perform LLR combining across different transmissions of a same transport block. In some examples, the feedback scheme for the first subgroup 420-*a* may allow the UE 115-*d* to transmit feedback reports for messages 405 of both LB and HB spectrum using a same carrier, such as the anchor cell of the group 415-*a*. Further, the UE 115-*d* may transmit feedback for an SCG on a PCell of MCG in place of on a PCell of the SCG.

In contrast, messages 405 associated with the subgroup 420-*b* may be configured to be feedback-less, such as using HARQ-less downlink transmissions, to mitigate feedback being received at a later time due to backhaul latency. For example, the UE 115-*d* may receive one or more messages 405 (e.g., a subset of transport blocks) associated with the subgroup 420-*b* and may be configured (e.g., by the indication 410) to monitor for a quantity of blind retransmissions 406 for each HARQ process ID of the one or more messages 405. Additionally, or alternatively, downlink scheduling may be configured with more conservative parameters (e.g., low modulation and coding schemes (MCS), large quantity of resources) to increase a chance of successful reception at the UE 115-*d*.

HARQ-less messaging may in some cases rely on RLC feedback. For example, RLC retransmissions 407 may be transmitted as needed following one or more messages 405 that do not have feedback configured (e.g., for logical channels configured with RLC-AM over MAC and PHY). In response, the UE 115-*d* may transmit an RLC status indicator 430 (e.g., PDU transmission indicating the ACK/NAK). In some examples, the UE 115-*b* may transmit RLC status indicator 430 (e.g., PDU transmission) to the DU 165-*d*1 (with added latency with relaying) on the uplink anchor cell (e.g., anchor carrier, anchor CC) of the group 415-*a* of CCs or to the DU 165-*d*2 directly on the uplink anchor cell of the group 415-*b*. In some examples, the transmission of the RLC status indicator 430 may be with or without repetition. Using HARQ-less messaging may thus free up one or more HARQ processes at the DU 165-*d*2 to allow additional scheduling as the DU 165-*d*2 may not wait for feedback before continuing transmissions.

The subgroup 420-*c* may instead be configured to transmit uplink feedback directly to the DU 165-*d*2 on the uplink anchor cell of the group 415-*b* of CCs (e.g., in HB spectrum, or in LB spectrum or other grouping in another example), while using an increased quantity of repetitions for improved coverage. For example, one or more messages 405 (e.g., transport blocks) received via CCs of the subgroup 420-*c* may be HARQ-based, where the UE 115-*d* may transmit a corresponding feedback message 425 on the anchor cell of the group 415-*b* (e.g., PCell of the secondary PUCCH group in CA or Pscell of SCG in DC). The UE 115-*d* may also transmit one or more retransmissions 426 on uplink of the feedback message 425. In some examples, for the subgroup 420-*c*, downlink transmissions of the messages 405 may also be repetition based, and may involve HARQ-based retransmissions. Similar to the subgroup 420-*b*, the UE 115-*d* may receive an RLC retransmission 407 and transmit an RLC status indicator 430 when triggered. Notably, by transmitting directly to the DU 165-*d*2 (via the RU 170-*d*2) on the anchor carrier of the group 415-*b*, utilizing the subgroup 420-*c* may reduce latency in feedback.

In some examples, the UE 115-*d* may generate two or more sets of feedback (e.g., uplink feedback) separately using the one or more groups 415 and subgroups 420. For example, first uplink feedback may be transmitted via the anchor carrier of the group 415-*a* (e.g., LB anchor carrier) while second uplink feedback may be sent via the anchor carrier of the group 415-*b* (e.g., HB anchor carrier). In some examples (e.g., if the feedback is HARQ-ACK bits), the UE 115-*d* may generate independent HARQ codebooks for the feedback. For example, the UE 115-*d* may generate a first codebook for feedback sent on the group 415-*a* anchor carrier (e.g., feedback for the group 415-*a*, feedback for the subgroup 420-*a*, or both) and a second codebook for feedback sent on the group 415-*b* anchor carrier (e.g., feedback for the subgroup 420-*c*). Codebooks may also be based on which messaging feedback is associated with. For example, a first codebook may be associated with feedback for the group 415-*a*, while a second codebook may be associated with feedback for the group 415-*b* and subgroups 420-*a*, 420-*b*, 420-*c*, etc.

Using the subgroups 420-*b* and 420-*c* thus may free up one or more HARQ processes more quickly by mitigating the turn-around time of the feedback relayed by the DU 165-*d*1 to fill in one or more the gaps in scheduling and allow scheduling of new messages 305, reducing downlink throughput degradation. Further, by assigning some feedback bits to subgroup 420-*a* in combination with the subgroups 420-*b* and 420-*c*, additional overhead used to increase the uplink coverage of the subgroups 420-*b* and 420-*c* may be mitigated while avoiding degrading spectral efficiency.

Additionally, or alternatively, further methods may be used to mitigate latency. For example, if latency incurred by a backhaul link is under or within a threshold, the DU 165-*c*2 may delay retransmission of one or more messages 405 and may fill in gaps in data transmission scheduling with new messages 405 for transmission associated with other HARQ process IDs. In some examples, to define a larger quantity of HARQ processes, a UE memory buffer size may include one or more parameters in order to avoid degrading performance.

Additionally, or alternatively, the associated procedures may be used flexibly by a network and with associated signaling for any subgroup 420 (e.g., for different quantities of downlink repetitions or uplink repetitions, based on a utility of HARQ feedback, based on an anchor carrier for uplink transmission). Further, feedback schemes may be updated via downlink control information (DCI) or dynamically for the subgroups 420 (e.g., the subgroups 420-*b* and 420-*c*) or for new subgroups 420. The subgroup 420-*a* may also be defined explicitly with mapping between transport blocks, logical channels, logical channel groups, and RLC segments to indicate which feedback bits may be aggregated and sent when feedback is triggered. In some examples, feedback reporting may be performed on multiple CCs (e.g., split across CCs) in CA, and for DC reporting, RLC status reports may in some cases be transmitted over another configured grant. Outer coding may also be performed across different messages 405 (e.g., transport blocks) to improve reliability and reduce overhead in an LB spectrum. In some examples, an HB spectrum may utilize a low duty cycle, for example, when PUCCH on HB may not be reliably sent with repetition.

Figure 5:
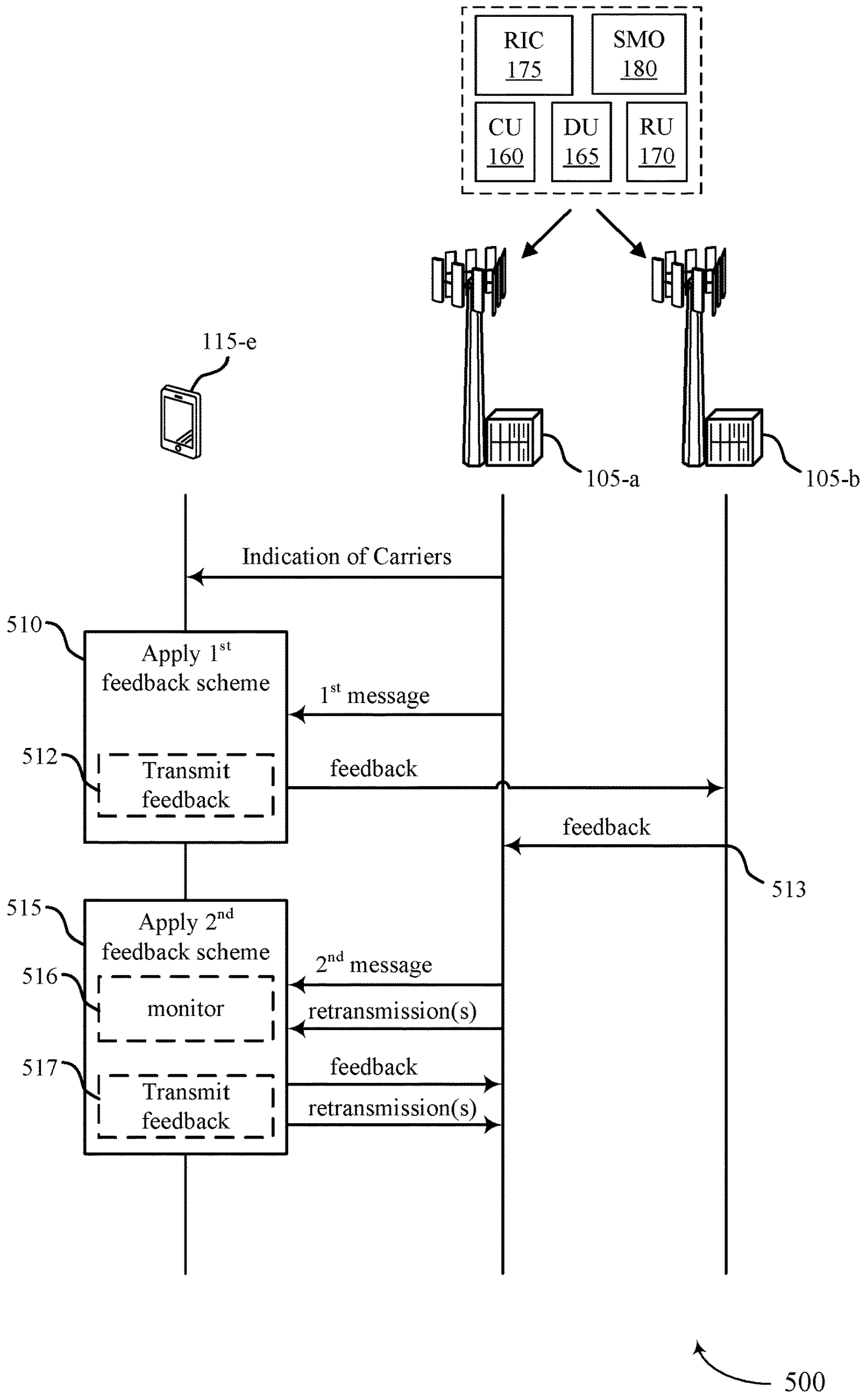
FIG. 5 shows an example of a process flow that supports feedback enhancements for multi-carrier operation in accordance with one or more aspects of the present disclosure.

FIG. 5 shows an example of a process flow 500 that supports feedback enhancements for multi-carrier operation in accordance with one or more aspects of the present disclosure. In some examples, the process flow 500 may implement or be implemented by aspects of the wireless communications systems 100 and 400, the network architecture 200, the feedback configurations 301 and 302, or any combination thereof. For example, the process flow 500 may include one or more UEs 115, including a UE 115-*c*, and one or more network entities 105, including a network entity 105-*a* and a network entity 105-*b*. The network entities 105-*a* and 105-*b* may each include one or more of a CU 160, a DU 165, an RU 170, an RIC 175, an SMO system 180, or any combination thereof, collocated or distributed.

In the following description of the process flow 500, the operations may be performed (such as reported or provided) in a different order than the order shown, or the operations performed by the example devices may be performed in different orders or at different times. Some operations also may be omitted from the process flow 500, or other operations may be added to the process flow 500. Further, although some operations or signaling may be shown to occur at different times for discussion purposes, these operations may actually occur at the same time or at least partially concurrently.

At 505, the UE 115-*e* may receive, and the network entity 105-*b* may output (e.g., transmit directly, or via one or more components such as a CU 160, a DU 165, or an RU 170) an indication of a first set of one or more downlink carriers (e.g., downlink CCs) and a second set of one or more downlink carriers. In some examples, the indication may indicate a set of multiple subsets of one or more downlink carriers that are each within the second set of one or more downlink carriers.

In some examples, the first set of one or more downlink carriers and the second set of one or more downlink carriers may be grouped based on a respective cell group, a respective uplink control channel group, one or more respective frequency bands (e.g., FR1, FR2), one or more respective subcarrier spacings, one or more respective bandwidths, one or more respective processing timelines, or any combination thereof, of each downlink carrier of the first set and the second set. Additionally, or alternatively, the first subset and the second subset within the second set of one or more downlink carriers may be grouped based on a respective cell index, a respective feedback process identifier (e.g., HARQ process ID), a respective logical channel, a respective logical channel group, or any combination thereof, of each downlink carrier of the first set and the second set.

At 510, the UE 115-*e* may receive a first message via a first subset of the set of multiple subsets of one or more downlink carriers and may apply a first feedback scheme for feedback associated with the first message. In some examples, the first message may be output in accordance with the first feedback scheme for feedback associated with the first message, and the first feedback scheme may be applied based on the first message being received via the first subset. The first feedback scheme may be applied for feedback that pertains to messages output via the first set of one or more downlink carriers.

In some examples, applying the first feedback scheme may include transmitting a feedback message indicating feedback associated with the first message. For example, at 512, the UE 115-*e* may transmit a feedback message to the network entity 105-*b* (e.g., to an RU 170 that may relay to a DU 165). At 513, the network entity 105-*a* may obtain (e.g., receive directly, or via one or more components), based on the first feedback scheme, the feedback message indicating feedback associated with the first message from the network entity 105-*b* that may be different from the network entity 105-*a*.

In some cases, the feedback message may indicate feedback associated with one or more additional messages received via the first subset of the set of multiple subsets of one or more downlink carriers and may be transmitted based on receiving a trigger message. Additionally, or alternatively, the feedback message may be transmitted via an anchor carrier associated with the first set of one or more downlink carriers. The feedback message may also indicate feedback associated with a set of multiple retransmissions of the first message, may include one or more CRC bits, may indicate an identifier of the first network entity from which the first message may be received, or any combination thereof. In some cases, one or more RLC retransmissions may be disabled. Further, the UE 115-*e* may combine one or more LLR values associated with one or more retransmissions of the first message.

At 515, the UE 115-*e* may receive a second message via a second subset of the set of multiple subsets and may apply a second feedback scheme for feedback associated with the second message. In some examples, the second message may be output in accordance with the second feedback scheme and the second feedback scheme may be applied based on the second message being received via the second subset. The second feedback scheme may be different from the first feedback scheme. In some cases, a feedback process duration associated with the second feedback scheme may be less than a corresponding duration associated with the first feedback scheme.

Applying the second feedback scheme may include monitoring the second subset of the set of multiple subsets of one or more downlink carriers at 516 for one or more additional messages output by the network entity 105-*a*. In some cases, the one or more additional messages may include one or more retransmissions of the second message, where the one or more retransmissions may be due, at least in part, to an absence of feedback reporting in the second feedback scheme.

Additionally, or alternatively, applying the second feedback scheme may include transmitting a feedback message to the network entity 105-*a* (e.g., directly) at 517 that indicates feedback associated with the second message, and transmitting one or more additional feedback messages indicating the feedback associated with the second message, wherein the one or more additional feedback messages include one or more retransmissions of the feedback message. In some examples, the feedback message and the one or more additional feedback messages may be transmitted via an anchor carrier associated with the second set of one or more downlink carriers. In some examples, the UE 115-*c* may transmit, and the network entity 105-*a* may obtain, an RLC status indicator (e.g., an RLC status PDU) associated with the first set, the first subset, the second subset, or any combination thereof.

Figure 6:
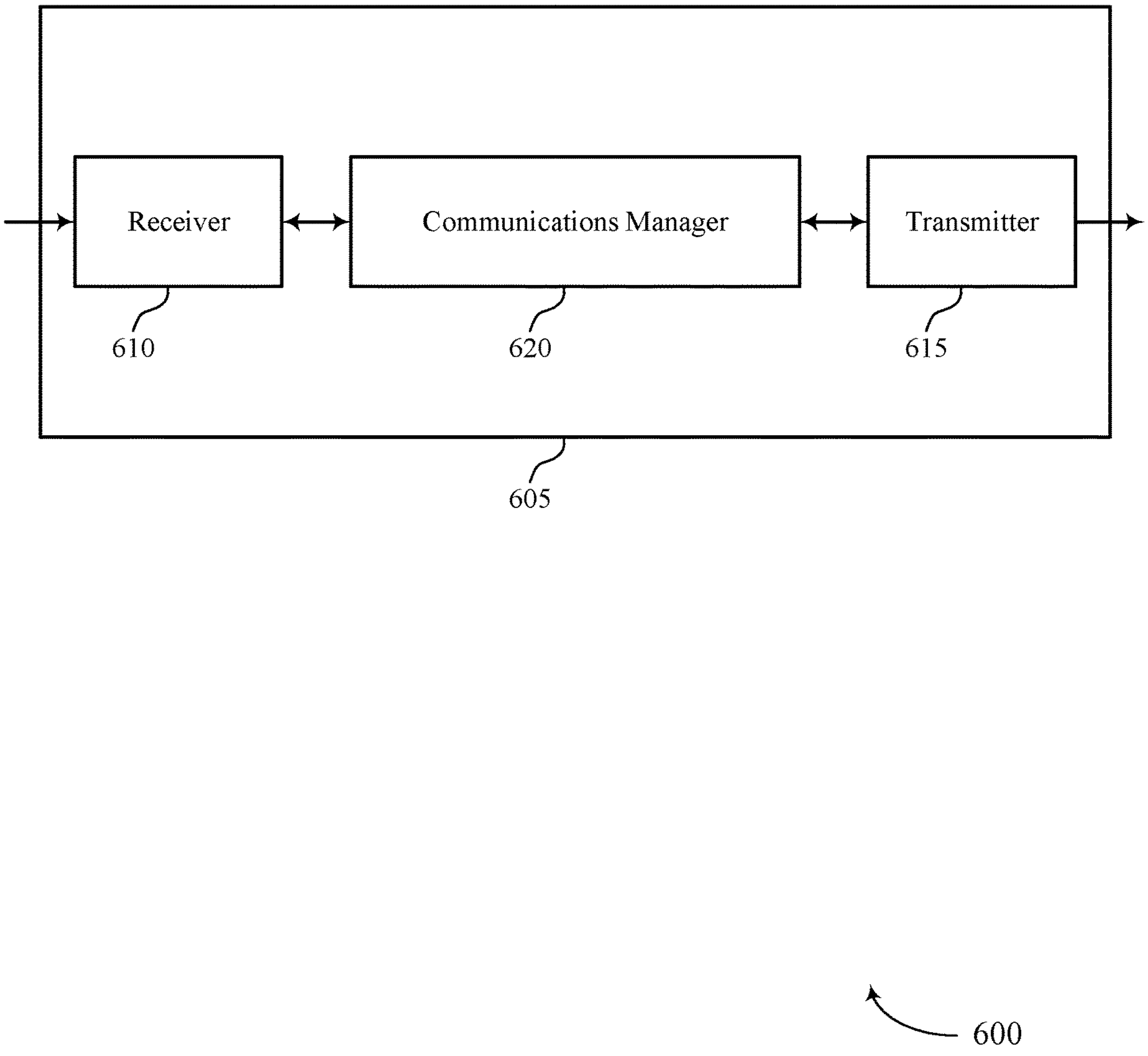
FIGS. 6 and 7 show block diagrams of devices that support feedback enhancements for multi-carrier operation in accordance with one or more aspects of the present disclosure.

FIG. 6 shows a block diagram 600 of a device 605 that supports feedback enhancements for multi-carrier operation in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to feedback enhancements for multi-carrier operation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to feedback enhancements for multi-carrier operation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations or components thereof may be examples of means for performing various aspects of feedback enhancements for multi-carrier operation as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving an indication of a first set of one or more downlink carriers and a second set of one or more downlink carriers, where the indication further indicates a set of multiple subsets of one or more downlink carriers that are each within the second set of one or more downlink carriers. The communications manager 620 is capable of, configured to, or operable to support a means for receiving a first message via a first subset of the set of multiple subsets of one or more downlink carriers. The communications manager 620 is capable of, configured to, or operable to support a means for applying a first feedback scheme for feedback associated with the first message, where the first feedback scheme is applied based on the first message being received via the first subset. The communications manager 620 is capable of, configured to, or operable to support a means for receiving a second message via a second subset of the set of multiple subsets of one or more downlink carriers. The communications manager 620 is capable of, configured to, or operable to support a means for applying a second feedback scheme for feedback associated with the second message, where the second feedback scheme is applied based on the second message being received via the second subset, and where the second feedback scheme is different from the first feedback scheme.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, and more efficient utilization of communication resources by supporting different subgroups of CCs including separate feedback schemes.

Figure 7:
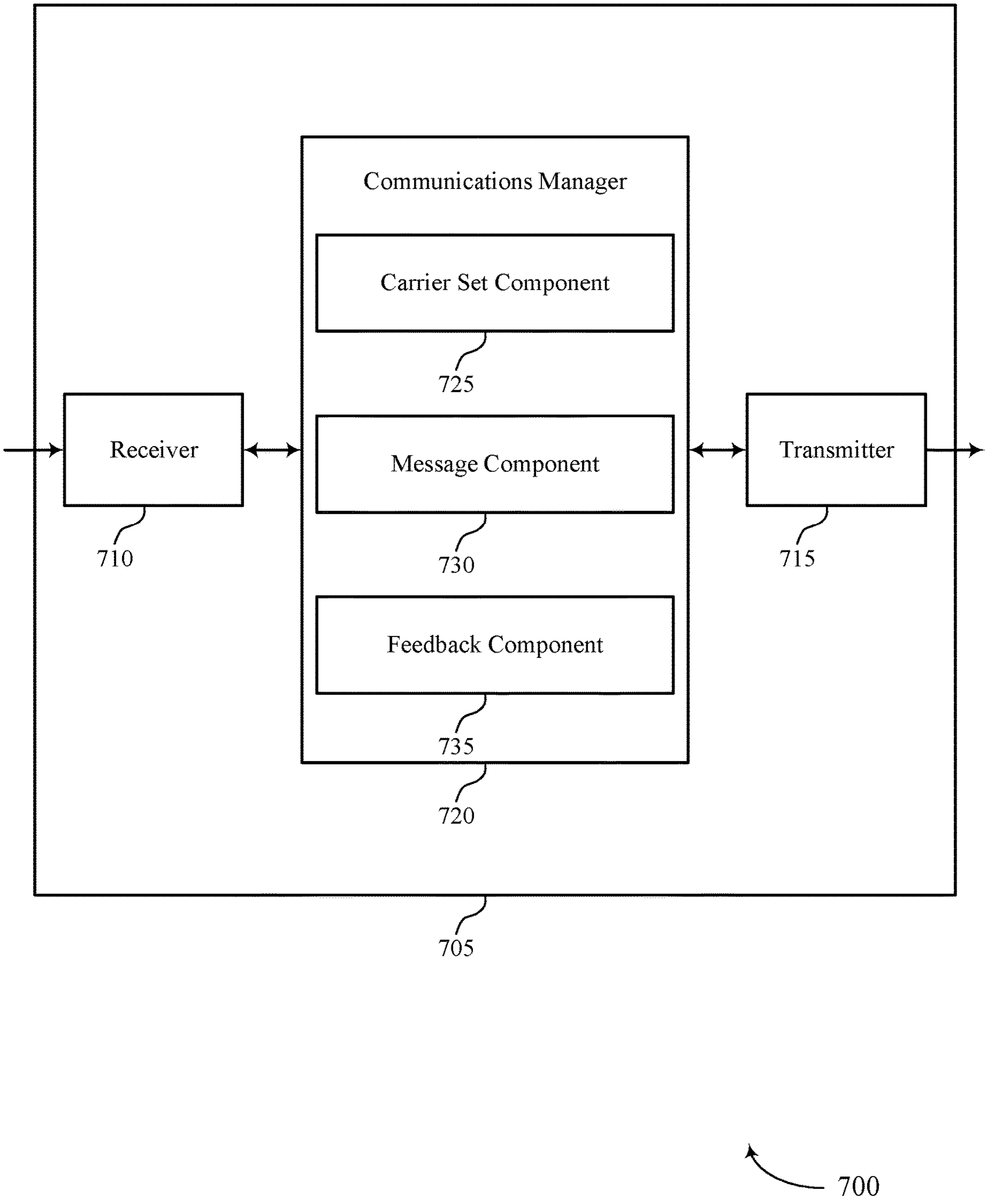

FIG. 7 shows a block diagram 700 of a device 705 that supports feedback enhancements for multi-carrier operation in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to feedback enhancements for multi-carrier operation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to feedback enhancements for multi-carrier operation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of feedback enhancements for multi-carrier operation as described herein. For example, the communications manager 720 may include a carrier set component 725, a message component 730, a feedback component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The carrier set component 725 is capable of, configured to, or operable to support a means for receiving an indication of a first set of one or more downlink carriers and a second set of one or more downlink carriers, where the indication further indicates a set of multiple subsets of one or more downlink carriers that are each within the second set of one or more downlink carriers. The message component 730 is capable of, configured to, or operable to support a means for receiving a first message via a first subset of the set of multiple subsets of one or more downlink carriers. The feedback component 735 is capable of, configured to, or operable to support a means for applying a first feedback scheme for feedback associated with the first message, where the first feedback scheme is applied based on the first message being received via the first subset. The message component 730 is capable of, configured to, or operable to support a means for receiving a second message via a second subset of the set of multiple subsets of one or more downlink carriers. The feedback component 735 is capable of, configured to, or operable to support a means for applying a second feedback scheme for feedback associated with the second message, where the second feedback scheme is applied based on the second message being received via the second subset, and where the second feedback scheme is different from the first feedback scheme.

Figure 8:
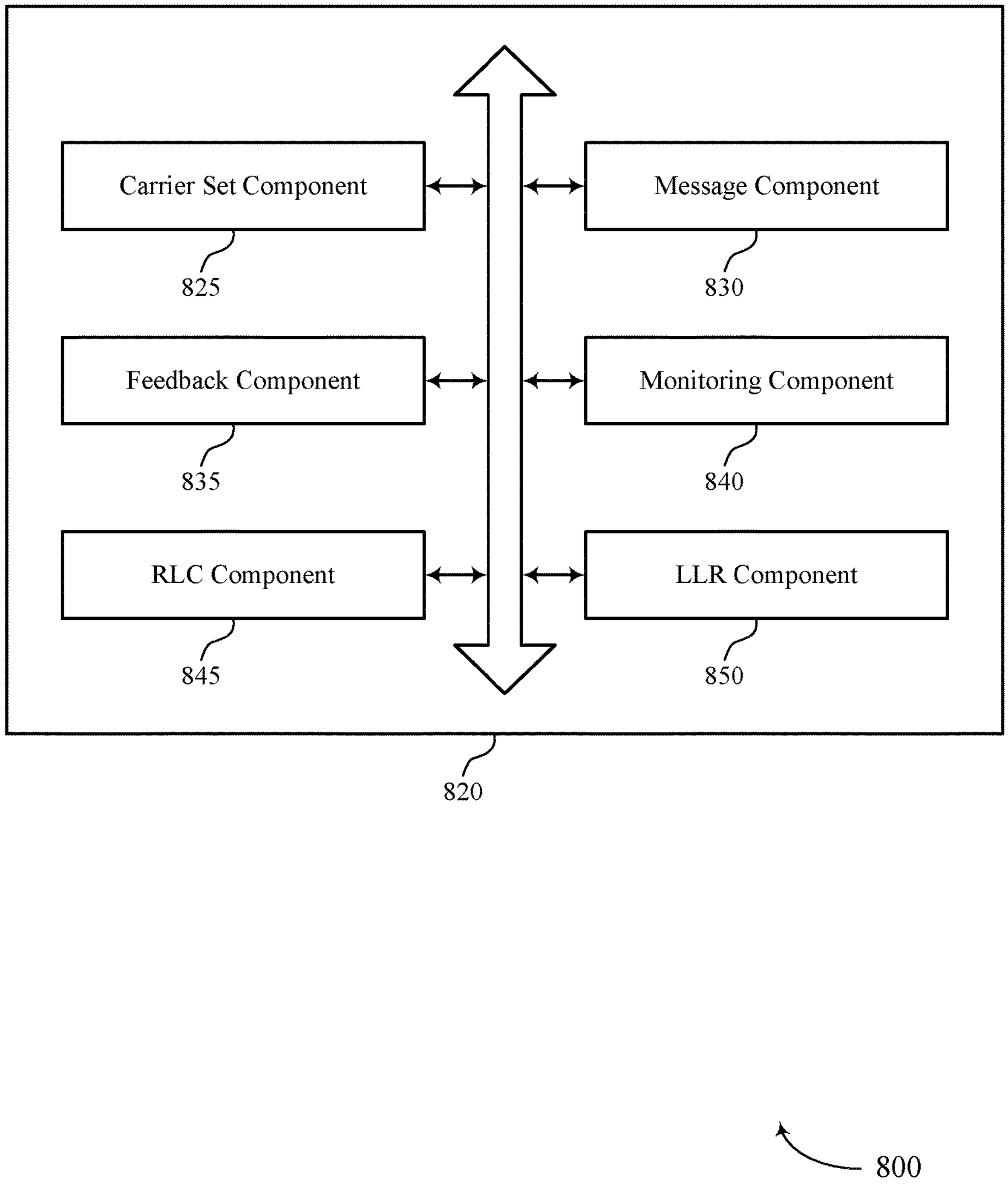
FIG. 8 shows a block diagram of a communications manager that supports feedback enhancements for multi-carrier operation in accordance with one or more aspects of the present disclosure.

FIG. 8 shows a block diagram 800 of a communications manager 820 that supports feedback enhancements for multi-carrier operation in accordance with one or more aspects of the present disclosure. The communications manager 820 may be an example of aspects of a communications manager 620, a communications manager 720, or both, as described herein. The communications manager 820, or various components thereof, may be an example of means for performing various aspects of feedback enhancements for multi-carrier operation as described herein. For example, the communications manager 820 may include a carrier set component 825, a message component 830, a feedback component 835, a monitoring component 840, an RLC component 845, an LLR component 850, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The carrier set component 825 is capable of, configured to, or operable to support a means for receiving an indication of a first set of one or more downlink carriers and a second set of one or more downlink carriers, where the indication further indicates a set of multiple subsets of one or more downlink carriers that are each within the second set of one or more downlink carriers. The message component 830 is capable of, configured to, or operable to support a means for receiving a first message via a first subset of the set of multiple subsets of one or more downlink carriers. The feedback component 835 is capable of, configured to, or operable to support a means for applying a first feedback scheme for feedback associated with the first message, where the first feedback scheme is applied based on the first message being received via the first subset. In some examples, the message component 830 is capable of, configured to, or operable to support a means for receiving a second message via a second subset of the set of multiple subsets of one or more downlink carriers. In some examples, the feedback component 835 is capable of, configured to, or operable to support a means for applying a second feedback scheme for feedback associated with the second message, where the second feedback scheme is applied based on the second message being received via the second subset, and where the second feedback scheme is different from the first feedback scheme.

In some examples, a feedback process duration associated with the second feedback scheme is less than a corresponding duration associated with the first feedback scheme.

In some examples, to support applying the first feedback scheme, the feedback component 835 is capable of, configured to, or operable to support a means for transmitting a feedback message indicating feedback associated with the first message, where the indication, the first message, and the second message are received from a first network entity, and where the feedback message is transmitted to a second network different from the first network entity.

In some examples, the feedback message indicates feedback associated with one or more additional messages received via the first subset of the set of multiple subsets of one or more downlink carriers and is transmitted based on receiving a trigger message. In some examples, the feedback message is transmitted via an anchor carrier associated with the first set of one or more downlink carriers. In some examples, the feedback message indicates feedback associated with a set of multiple retransmissions of the first message. In some examples, the feedback message includes one or more CRC bits. In some examples, the feedback message indicates an identifier of the first network entity from which the first message is received. In some examples, one or more RLC retransmissions are disabled.

In some examples, the LLR component 850 is capable of, configured to, or operable to support a means for combining one or more log-likelihood ratio values associated with one or more retransmissions of the first message.

In some examples, to support applying the second feedback scheme, the monitoring component 840 is capable of, configured to, or operable to support a means for monitoring the second subset of the set of multiple subsets of one or more downlink carriers for one or more additional messages, where the one or more additional messages include one or more retransmissions of the second message, where the one or more retransmissions are due, at least in part, to an absence of feedback reporting in the second feedback scheme.

In some examples, to support applying the second feedback scheme, the feedback component 835 is capable of, configured to, or operable to support a means for transmitting a feedback message indicating feedback associated with the second message. In some examples, to support applying the second feedback scheme, the feedback component 835 is capable of, configured to, or operable to support a means for transmitting one or more additional feedback messages indicating the feedback associated with the second message, where the one or more additional feedback messages include one or more retransmissions of the feedback message.

In some examples, the feedback message and the one or more additional feedback messages are transmitted via an anchor carrier associated with the second set of one or more downlink carriers.

In some examples, to support applying the first feedback scheme and the second feedback scheme, the feedback component 835 is capable of, configured to, or operable to support a means for transmitting one or more first feedback messages indicating feedback associated with the first message, where the one or more first feedback messages are transmitted via an anchor carrier associated with the first set of one or more downlink carriers and in accordance with a first codebook and the first feedback scheme. In some examples, to support applying the first feedback scheme and the second feedback scheme, the feedback component 835 is capable of, configured to, or operable to support a means for transmitting one or more second feedback messages indicating feedback associated with the second message, where the one or more second feedback messages are transmitted via an anchor carrier associated with the second set of one or more downlink carriers and in accordance with a second codebook and the second feedback scheme.

In some examples, the RLC component 845 is capable of, configured to, or operable to support a means for transmitting an RLC status indicator associated with the first set, the first subset, the second subset, or any combination thereof.

In some examples, the first feedback scheme is applied for feedback that pertains to messages received via the first set of one or more downlink carriers.

In some examples, the first set of one or more downlink carriers and the second set of one or more downlink carriers are grouped based on a respective cell group, a respective uplink control channel group, one or more respective frequency bands, one or more respective subcarrier spacings, one or more respective bandwidths, one or more respective processing timelines, or any combination thereof, of each downlink carrier of the first set and the second set.

In some examples, the first subset within the second set of one or more downlink carriers and the second subset within the second set of one or more downlink carriers are grouped based on a respective cell index, a respective feedback process identifier, a respective logical channel, a respective logical channel group, or any combination thereof, of each downlink carrier of the first set and the second set.

Figure 9:
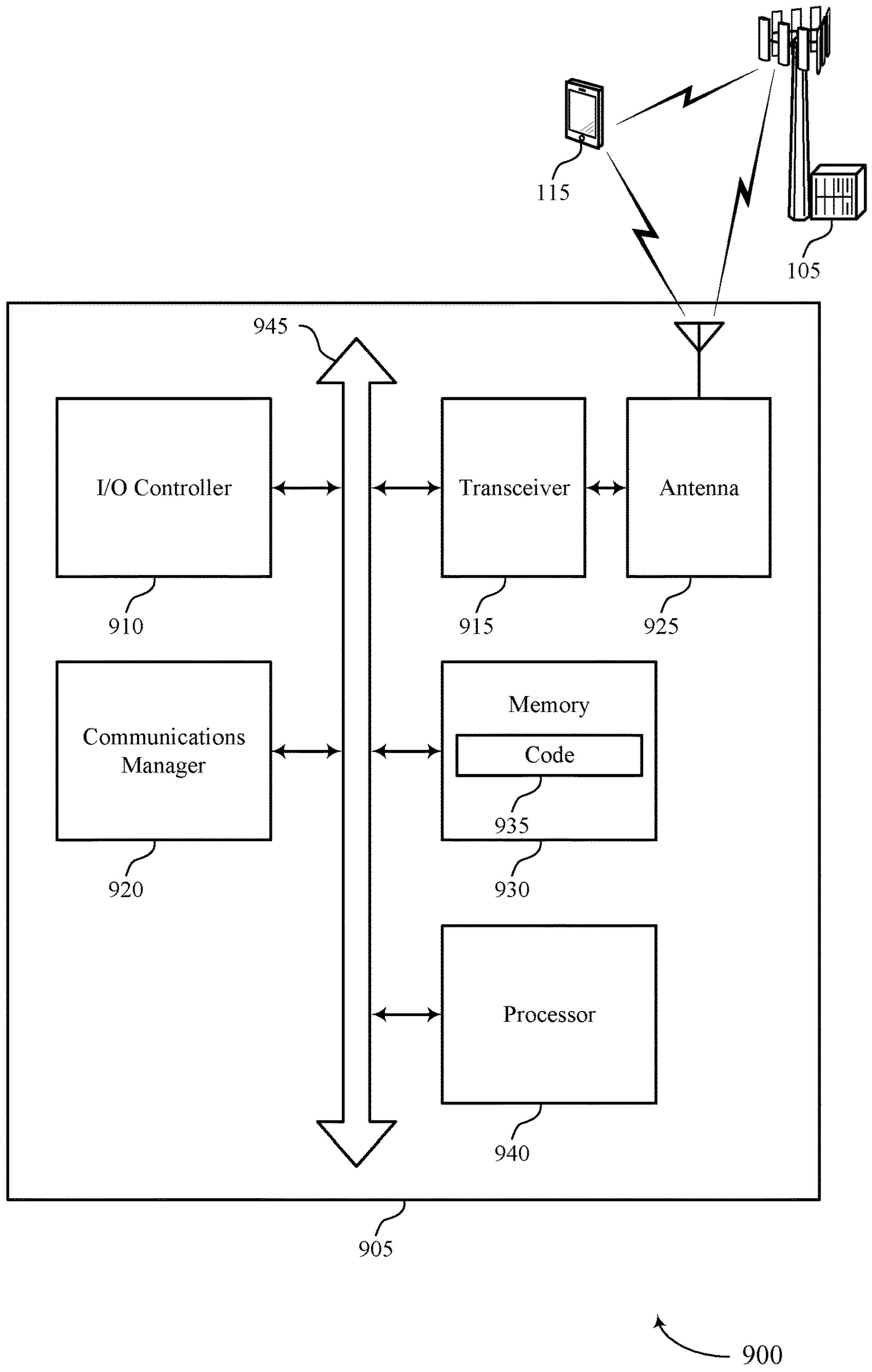
FIG. 9 shows a diagram of a system including a device that supports feedback enhancements for multi-carrier operation in accordance with one or more aspects of the present disclosure.

FIG. 9 shows a diagram of a system 900 including a device 905 that supports feedback enhancements for multi-carrier operation in accordance with one or more aspects of the present disclosure. The device 905 may be an example of or include components of a device 605, a device 705, or a UE 115 as described herein. The device 905 may communicate (e.g., wirelessly) with one or more other devices (e.g., network entities 105, UEs 115, or a combination thereof). The device 905 may include components for bi-directional voice and data communications including components for transmitting and receiving communications, such as a communications manager 920, an input/output (I/O) controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting feedback enhancements for multi-carrier operation). For example, the device 905 or a component of the device 905 may include at least one processor 940 and at least one memory 930 coupled with or to the at least one processor 940, the at least one processor 940 and the at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving an indication of a first set of one or more downlink carriers and a second set of one or more downlink carriers, where the indication further indicates a set of multiple subsets of one or more downlink carriers that are each within the second set of one or more downlink carriers. The communications manager 920 is capable of, configured to, or operable to support a means for receiving a first message via a first subset of the set of multiple subsets of one or more downlink carriers. The communications manager 920 is capable of, configured to, or operable to support a means for applying a first feedback scheme for feedback associated with the first message, where the first feedback scheme is applied based on the first message being received via the first subset. The communications manager 920 is capable of, configured to, or operable to support a means for receiving a second message via a second subset of the set of multiple subsets of one or more downlink carriers. The communications manager 920 is capable of, configured to, or operable to support a means for applying a second feedback scheme for feedback associated with the second message, where the second feedback scheme is applied based on the second message being received via the second subset, and where the second feedback scheme is different from the first feedback scheme.

By including or configuring the communications manager 920 in accordance with examples as described herein, the device 905 may support techniques for improved communication reliability, reduced latency in feedback, improved user experience related to reduced processing, reduced power consumption, more efficient utilization of communication resources, improved coordination between devices, longer battery life, and improved utilization of processing capability by supporting different subgroups of CCs including separate feedback schemes.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of feedback enhancements for multi-carrier operation as described herein, or the at least one processor 940 and the at least one memory 930 may be otherwise configured to, individually or collectively, perform or support such operations.

Figure 10:
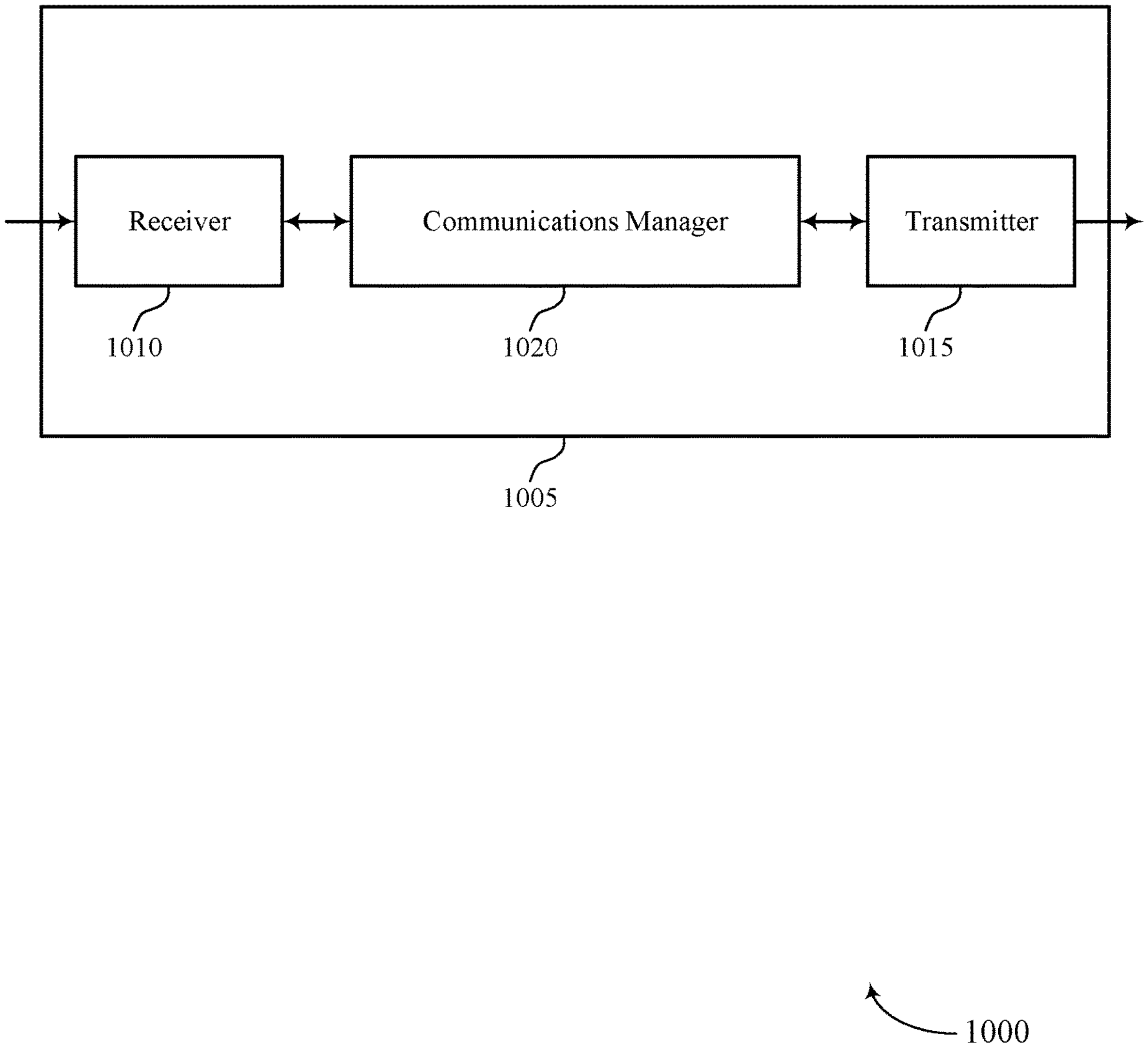
FIGS. 10 and 11 show block diagrams of devices that support feedback enhancements for multi-carrier operation in accordance with one or more aspects of the present disclosure.

FIG. 10 shows a block diagram 1000 of a device 1005 that supports feedback enhancements for multi-carrier operation in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations or components thereof may be examples of means for performing various aspects of feedback enhancements for multi-carrier operation as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for outputting an indication of a first set of one or more downlink carriers and a second set of one or more downlink carriers, where the indication further indicates a set of multiple subsets of one or more downlink carriers that are each within the second set of one or more downlink carriers. The communications manager 1020 is capable of, configured to, or operable to support a means for outputting a first message via a first subset of the set of multiple subsets of one or more downlink carriers in accordance with a first feedback scheme for feedback associated with the first message. The communications manager 1020 is capable of, configured to, or operable to support a means for outputting a second message via a second subset of the set of multiple subsets of one or more downlink carriers in accordance with a second feedback scheme for feedback associated with the second message, where the second feedback scheme is different from the first feedback scheme.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, reduced power consumption, and more efficient utilization of communication resources by supporting different subgroups of CCs including separate feedback schemes.

Figure 11:
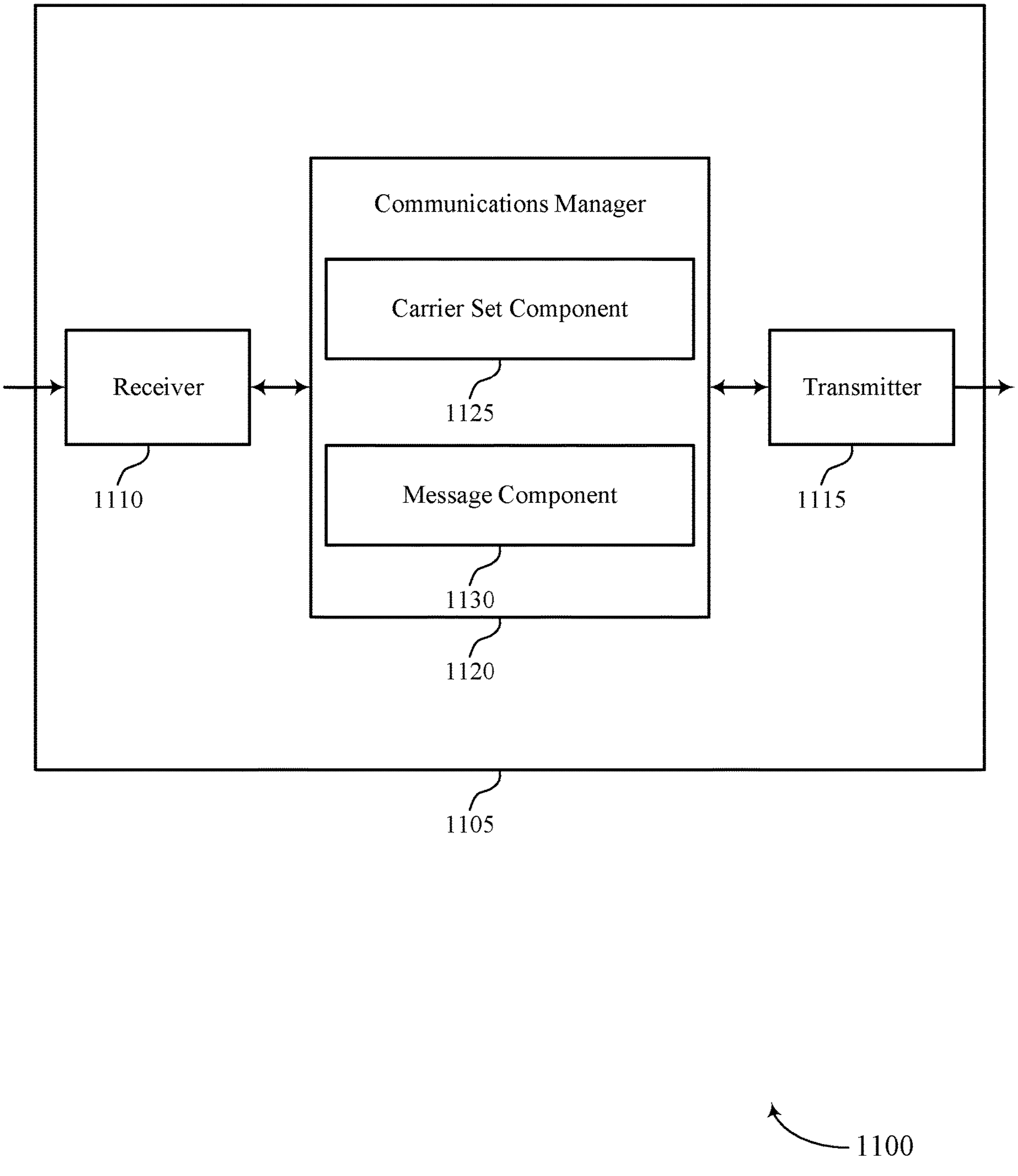

FIG. 11 shows a block diagram 1100 of a device 1105 that supports feedback enhancements for multi-carrier operation in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas.

Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of feedback enhancements for multi-carrier operation as described herein. For example, the communications manager 1120 may include a carrier set component 1125 a message component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The carrier set component 1125 is capable of, configured to, or operable to support a means for outputting an indication of a first set of one or more downlink carriers and a second set of one or more downlink carriers, where the indication further indicates a set of multiple subsets of one or more downlink carriers that are each within the second set of one or more downlink carriers. The message component 1130 is capable of, configured to, or operable to support a means for outputting a first message via a first subset of the set of multiple subsets of one or more downlink carriers in accordance with a first feedback scheme for feedback associated with the first message. The message component 1130 is capable of, configured to, or operable to support a means for outputting a second message via a second subset of the set of multiple subsets of one or more downlink carriers in accordance with a second feedback scheme for feedback associated with the second message, where the second feedback scheme is different from the first feedback scheme.

Figure 12:
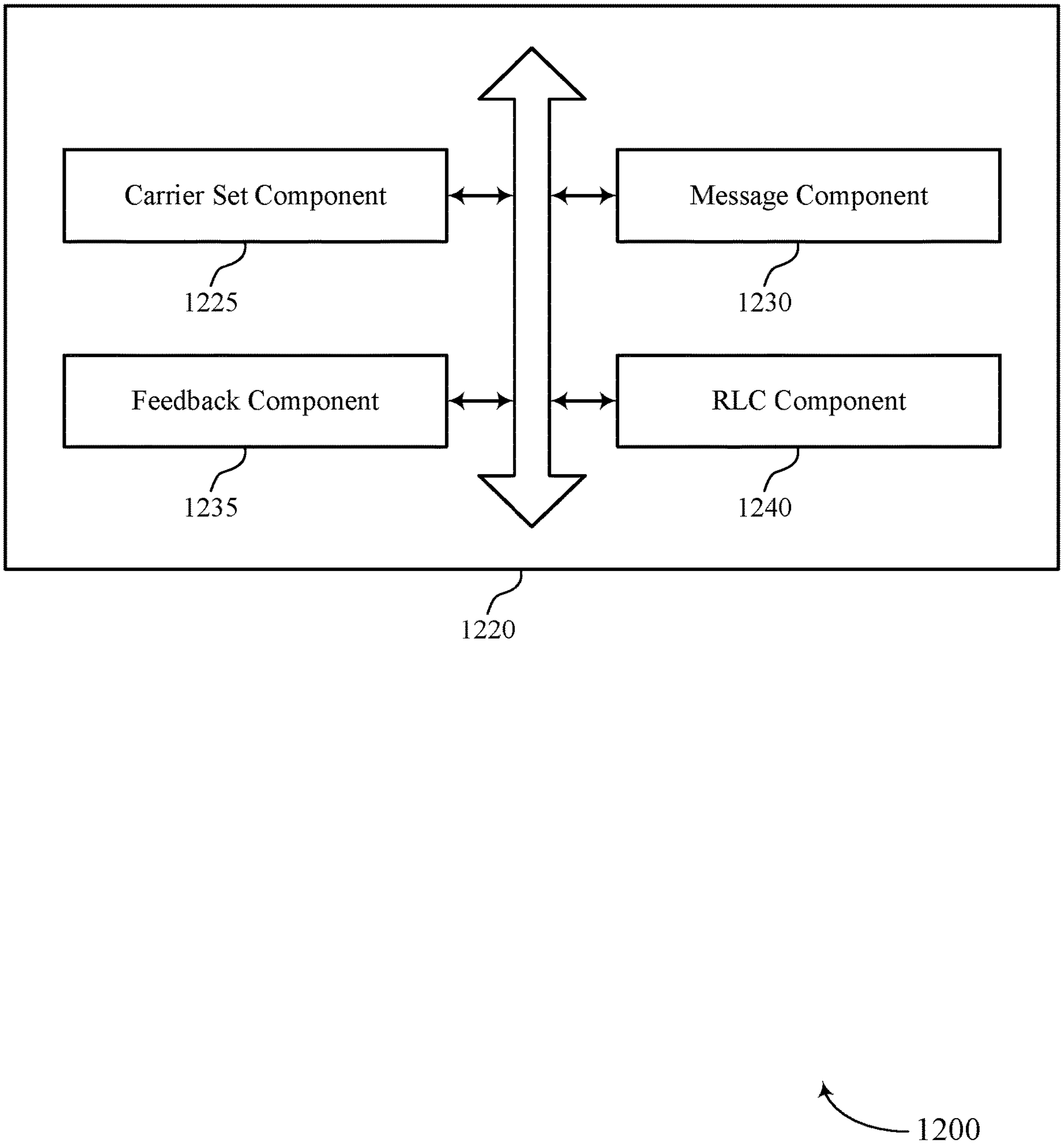
FIG. 12 shows a block diagram of a communications manager that supports feedback enhancements for multi-carrier operation in accordance with one or more aspects of the present disclosure.

FIG. 12 shows a block diagram 1200 of a communications manager 1220 that supports feedback enhancements for multi-carrier operation in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of feedback enhancements for multi-carrier operation as described herein. For example, the communications manager 1220 may include a carrier set component 1225, a message component 1230, a feedback component 1235, an RLC component 1240, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The carrier set component 1225 is capable of, configured to, or operable to support a means for outputting an indication of a first set of one or more downlink carriers and a second set of one or more downlink carriers, where the indication further indicates a set of multiple subsets of one or more downlink carriers that are each within the second set of one or more downlink carriers. The message component 1230 is capable of, configured to, or operable to support a means for outputting a first message via a first subset of the set of multiple subsets of one or more downlink carriers in accordance with a first feedback scheme for feedback associated with the first message. In some examples, the message component 1230 is capable of, configured to, or operable to support a means for outputting a second message via a second subset of the set of multiple subsets of one or more downlink carriers in accordance with a second feedback scheme for feedback associated with the second message, where the second feedback scheme is different from the first feedback scheme.

In some examples, a feedback process duration associated with the second feedback scheme is less than a corresponding duration associated with the first feedback scheme.

In some examples, the feedback component 1235 is capable of, configured to, or operable to support a means for obtaining, based on the first feedback scheme, a feedback message indicating feedback associated with the first message, where the feedback message is obtained from a second network entity different from the network entity.

In some examples, the feedback message indicates feedback associated with one or more additional messages output via the first subset of the set of multiple subsets of one or more downlink carriers and is obtained based on outputting a trigger message.

In some examples, the feedback message indicates feedback associated with a set of multiple retransmissions of the first message. In some examples, the feedback message includes one or more CRC bits. In some examples, the feedback message indicates an identifier of the network entity. In some examples, one or more RLC retransmissions are disabled.

In some examples, the message component 1230 is capable of, configured to, or operable to support a means for outputting, based on the second feedback scheme, one or more additional messages via the second subset of the set of multiple subsets of one or more downlink carriers, where the one or more additional messages include one or more retransmissions of the second message, where the one or more retransmissions are due, at least in part, to an absence of feedback reporting in the second feedback scheme.

In some examples, the feedback component 1235 is capable of, configured to, or operable to support a means for obtaining a feedback message indicating feedback associated with the second message. In some examples, the feedback component 1235 is capable of, configured to, or operable to support a means for obtaining one or more additional feedback messages indicating the feedback associated with the second message, where the one or more additional feedback messages include one or more retransmissions of the feedback message.

In some examples, the feedback component 1235 is capable of, configured to, or operable to support a means for obtaining one or more first feedback messages indicating feedback associated with the first message, where the one or more first feedback messages are associated with a first codebook and are obtained in accordance with the first feedback scheme. In some examples, the feedback component 1235 is capable of, configured to, or operable to support a means for obtaining one or more second feedback messages indicating feedback associated with the second message, where the one or more second feedback messages are associated with a second codebook and are obtained in accordance with the second feedback scheme.

In some examples, the RLC component 1240 is capable of, configured to, or operable to support a means for obtaining an RLC status indicator associated with the first set, the first subset, the second subset, or any combination thereof.

In some examples, the first feedback scheme is applied for feedback that pertains to messages output via the first set of one or more downlink carriers.

In some examples, the first set of one or more downlink carriers and the second set of one or more downlink carriers are grouped based on a respective cell group, a respective uplink control channel group, one or more respective frequency bands, one or more respective subcarrier spacings, one or more respective bandwidths, one or more respective processing timelines, or any combination thereof, of each downlink carrier of the first set and the second set.

In some examples, the first subset within the second set of one or more downlink carriers and the second subset within the second set of one or more downlink carriers are grouped based on a respective cell index, a respective feedback process identifier, a respective logical channel, a respective logical channel group, or any combination thereof, of each downlink carrier of the first set and the second set.

Figure 13:
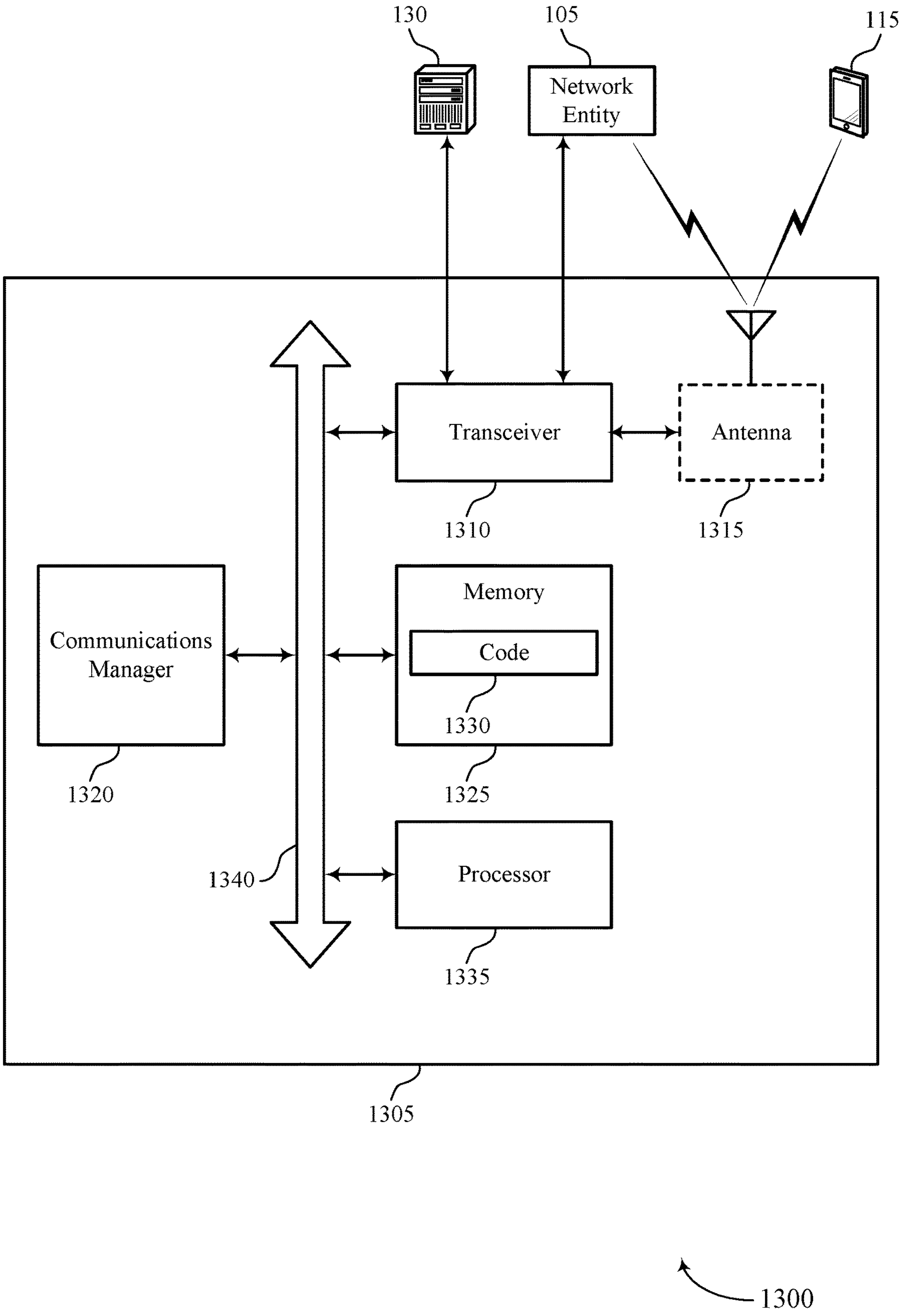
FIG. 13 shows a diagram of a system including a device that supports feedback enhancements for multi-carrier operation in accordance with one or more aspects of the present disclosure.

FIG. 13 shows a diagram of a system 1300 including a device 1305 that supports feedback enhancements for multi-carrier operation in accordance with one or more aspects of the present disclosure. The device 1305 may be an example of or include components of a device 1005, a device 1105, or a network entity 105 as described herein. The device 1305 may communicate with other network devices or network equipment such as one or more of the network entities 105, UEs 115, or any combination thereof. The communications may include communications over one or more wired interfaces, over one or more wireless interfaces, or any combination thereof. The device 1305 may include components that support outputting and obtaining communications, such as a communications manager 1320, a transceiver 1310, one or more antennas 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., communication link(s) 125, backhaul communication link(s) 120, a midhaul communication link 162, a fronthaul communication link 168).

The at least one memory 1325 may include RAM, ROM, or any combination thereof. The at least one memory 1325 may store computer-readable, computer-executable, or processor-executable code, such as the code 1330. The code 1330 may include instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may include, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting feedback enhancements for multi-carrier operation). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with one or more other network entities 105, and may include a controller or scheduler for controlling communications with UEs 115 (e.g., in cooperation with the one or more other network devices). In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for outputting an indication of a first set of one or more downlink carriers and a second set of one or more downlink carriers, where the indication further indicates a set of multiple subsets of one or more downlink carriers that are each within the second set of one or more downlink carriers. The communications manager 1320 is capable of, configured to, or operable to support a means for outputting a first message via a first subset of the set of multiple subsets of one or more downlink carriers in accordance with a first feedback scheme for feedback associated with the first message. The communications manager 1320 is capable of, configured to, or operable to support a means for outputting a second message via a second subset of the set of multiple subsets of one or more downlink carriers in accordance with a second feedback scheme for feedback associated with the second message, where the second feedback scheme is different from the first feedback scheme.

By including or configuring the communications manager 1320 in accordance with examples as described herein, the device 1305 may support techniques for improved communication reliability, reduced latency in feedback, improved user experience related to reduced processing, reduced power consumption, more efficient utilization of communication resources, improved coordination between devices, longer battery life, and improved utilization of processing capability by supporting different subgroups of CCs including separate feedback schemes.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of feedback enhancements for multi-carrier operation as described herein, or the at least one processor 1335 and the at least one memory 1325 may be otherwise configured to, individually or collectively, perform or support such operations.

Figure 14:
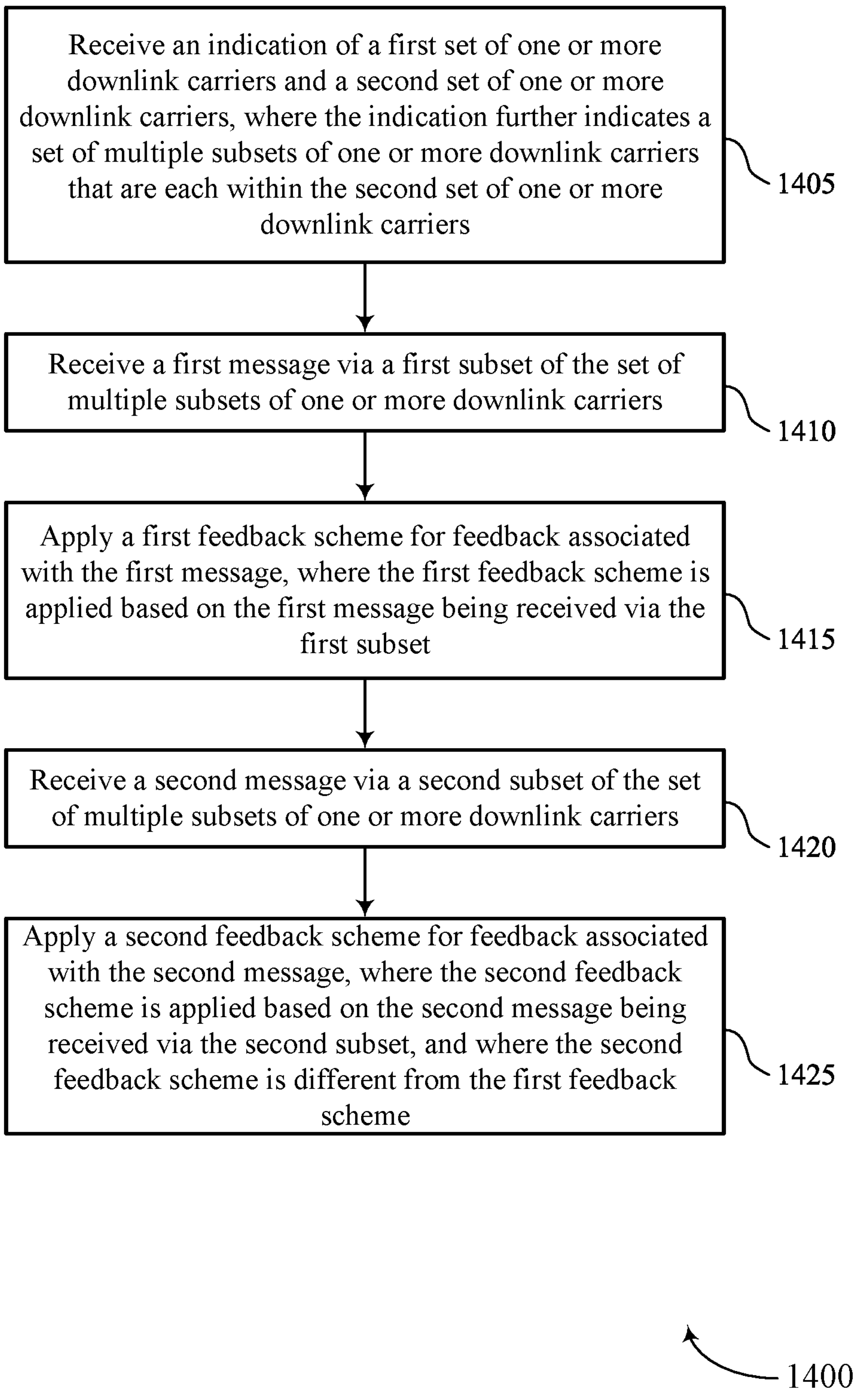
FIGS. 14 through 18 show flowcharts illustrating methods that support feedback enhancements for multi-carrier operation in accordance with one or more aspects of the present disclosure.

FIG. 14 shows a flowchart illustrating a method 1400 that supports feedback enhancements for multi-carrier operation in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving an indication of a first set of one or more downlink carriers and a second set of one or more downlink carriers, where the indication further indicates a set of multiple subsets of one or more downlink carriers that are each within the second set of one or more downlink carriers. The operations of 1405 may be performed in accordance with examples as disclosed herein. In some examples, aspects of the operations of 1405 may be performed by a carrier set component 825 as described with reference to FIG. 8.

At 1410, the method may include receiving a first message via a first subset of the set of multiple subsets of one or more downlink carriers. The operations of 1410 may be performed in accordance with examples as disclosed herein. In some examples, aspects of the operations of 1410 may be performed by a message component 830 as described with reference to FIG. 8.

At 1415, the method may include applying a first feedback scheme for feedback associated with the first message, where the first feedback scheme is applied based on the first message being received via the first subset. The operations of 1415 may be performed in accordance with examples as disclosed herein. In some examples, aspects of the operations of 1415 may be performed by a feedback component 835 as described with reference to FIG. 8.

At 1420, the method may include receiving a second message via a second subset of the set of multiple subsets of one or more downlink carriers. The operations of 1420 may be performed in accordance with examples as disclosed herein. In some examples, aspects of the operations of 1420 may be performed by a message component 830 as described with reference to FIG. 8.

At 1425, the method may include applying a second feedback scheme for feedback associated with the second message, where the second feedback scheme is applied based on the second message being received via the second subset, and where the second feedback scheme is different from the first feedback scheme. The operations of 1425 may be performed in accordance with examples as disclosed herein. In some examples, aspects of the operations of 1425 may be performed by a feedback component 835 as described with reference to FIG. 8.

Figure 15:
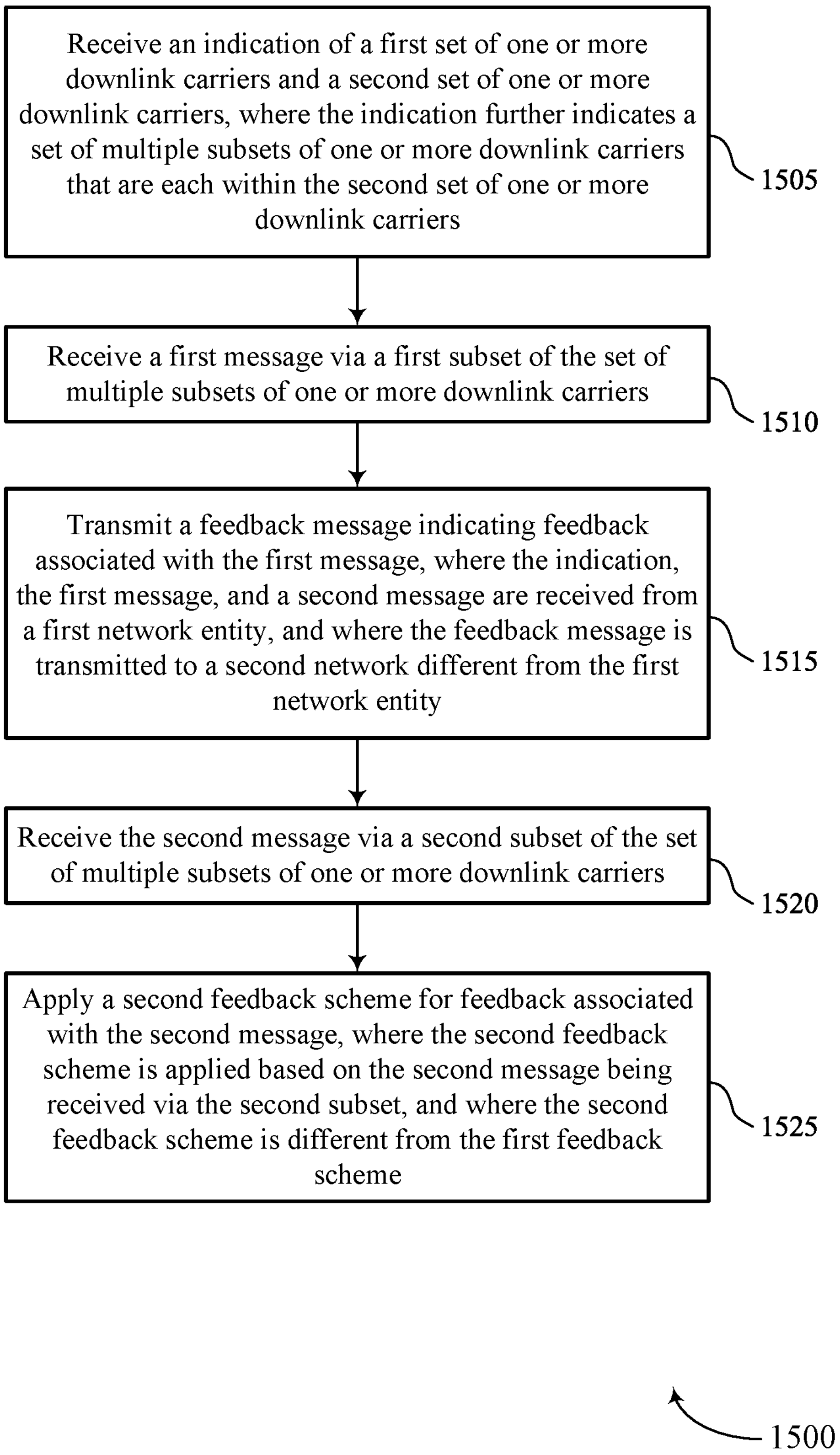

FIG. 15 shows a flowchart illustrating a method 1500 that supports feedback enhancements for multi-carrier operation in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving an indication of a first set of one or more downlink carriers and a second set of one or more downlink carriers, where the indication further indicates a set of multiple subsets of one or more downlink carriers that are each within the second set of one or more downlink carriers. The operations of 1505 may be performed in accordance with examples as disclosed herein. In some examples, aspects of the operations of 1505 may be performed by a carrier set component 825 as described with reference to FIG. 8.

At 1510, the method may include receiving a first message via a first subset of the set of multiple subsets of one or more downlink carriers. The operations of 1510 may be performed in accordance with examples as disclosed herein. In some examples, aspects of the operations of 1510 may be performed by a message component 830 as described with reference to FIG. 8.

At 1515, the method may include transmitting a feedback message indicating feedback associated with the first message, where the indication, the first message, and a second message are received from a first network entity, and where the feedback message is transmitted to a second network different from the first network entity. The operations of 1515 may be performed in accordance with examples as disclosed herein. In some examples, aspects of the operations of 1515 may be performed by a feedback component 835 as described with reference to FIG. 8.

At 1520, the method may include receiving the second message via a second subset of the set of multiple subsets of one or more downlink carriers. The operations of 1520 may be performed in accordance with examples as disclosed herein. In some examples, aspects of the operations of 1520 may be performed by a message component 830 as described with reference to FIG. 8.

At 1525, the method may include applying a second feedback scheme for feedback associated with the second message, where the second feedback scheme is applied based on the second message being received via the second subset, and where the second feedback scheme is different from the first feedback scheme. The operations of 1525 may be performed in accordance with examples as disclosed herein. In some examples, aspects of the operations of 1525 may be performed by a feedback component 835 as described with reference to FIG. 8.

Figure 16:
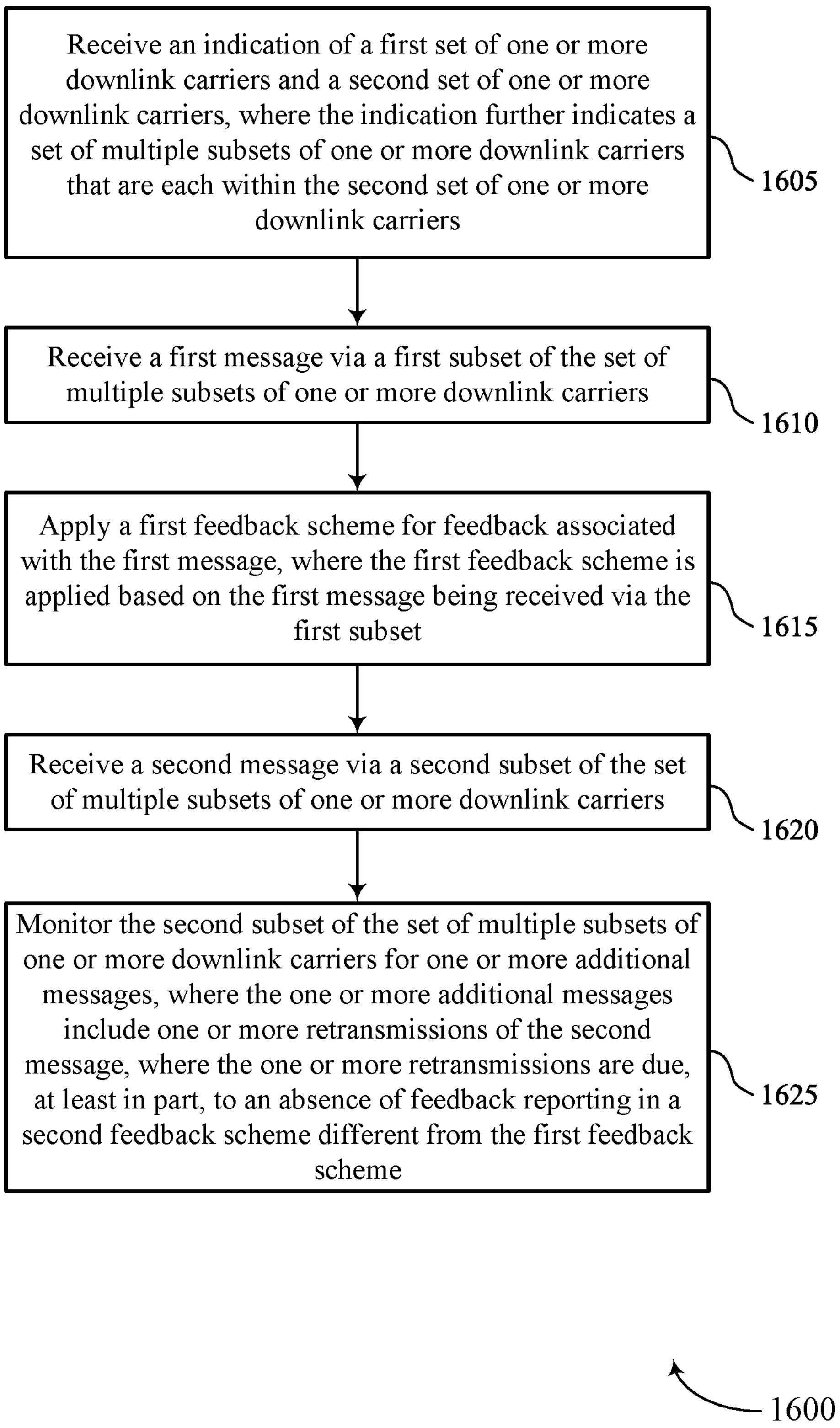

FIG. 16 shows a flowchart illustrating a method 1600 that supports feedback enhancements for multi-carrier operation in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving an indication of a first set of one or more downlink carriers and a second set of one or more downlink carriers, where the indication further indicates a set of multiple subsets of one or more downlink carriers that are each within the second set of one or more downlink carriers. The operations of 1605 may be performed in accordance with examples as disclosed herein. In some examples, aspects of the operations of 1605 may be performed by a carrier set component 825 as described with reference to FIG. 8.

At 1610, the method may include receiving a first message via a first subset of the set of multiple subsets of one or more downlink carriers. The operations of 1610 may be performed in accordance with examples as disclosed herein. In some examples, aspects of the operations of 1610 may be performed by a message component 830 as described with reference to FIG. 8.

At 1615, the method may include applying a first feedback scheme for feedback associated with the first message, where the first feedback scheme is applied based on the first message being received via the first subset. The operations of 1615 may be performed in accordance with examples as disclosed herein. In some examples, aspects of the operations of 1615 may be performed by a feedback component 835 as described with reference to FIG. 8.

At 1620, the method may include receiving a second message via a second subset of the set of multiple subsets of one or more downlink carriers. The operations of 1620 may be performed in accordance with examples as disclosed herein. In some examples, aspects of the operations of 1620 may be performed by a message component 830 as described with reference to FIG. 8.

At 1625, the method may include monitoring the second subset of the set of multiple subsets of one or more downlink carriers for one or more additional messages, where the one or more additional messages include one or more retransmissions of the second message, where the one or more retransmissions are due, at least in part, to an absence of feedback reporting in a second feedback scheme different from the first feedback scheme. The operations of 1625 may be performed in accordance with examples as disclosed herein. In some examples, aspects of the operations of 1625 may be performed by a monitoring component 840 as described with reference to FIG. 8.

Figure 17:
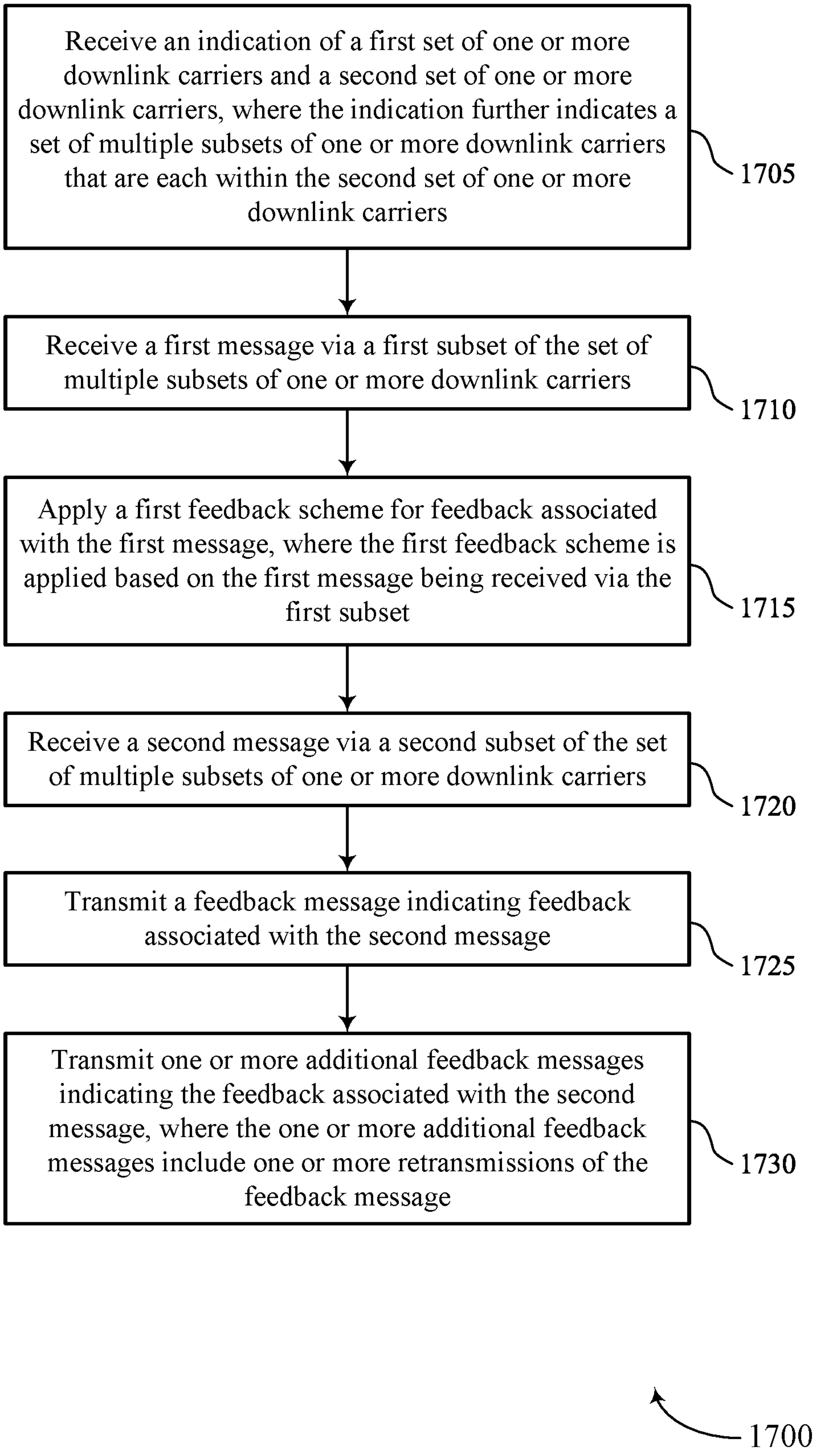

FIG. 17 shows a flowchart illustrating a method 1700 that supports feedback enhancements for multi-carrier operation in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving an indication of a first set of one or more downlink carriers and a second set of one or more downlink carriers, where the indication further indicates a set of multiple subsets of one or more downlink carriers that are each within the second set of one or more downlink carriers. The operations of 1705 may be performed in accordance with examples as disclosed herein. In some examples, aspects of the operations of 1705 may be performed by a carrier set component 825 as described with reference to FIG. 8.

At 1710, the method may include receiving a first message via a first subset of the set of multiple subsets of one or more downlink carriers. The operations of 1710 may be performed in accordance with examples as disclosed herein. In some examples, aspects of the operations of 1710 may be performed by a message component 830 as described with reference to FIG. 8.

At 1715, the method may include applying a first feedback scheme for feedback associated with the first message, where the first feedback scheme is applied based on the first message being received via the first subset. The operations of 1715 may be performed in accordance with examples as disclosed herein. In some examples, aspects of the operations of 1715 may be performed by a feedback component 835 as described with reference to FIG. 8.

At 1720, the method may include receiving a second message via a second subset of the set of multiple subsets of one or more downlink carriers. The operations of 1720 may be performed in accordance with examples as disclosed herein. In some examples, aspects of the operations of 1720 may be performed by a message component 830 as described with reference to FIG. 8.

At 1725, the method may include transmitting a feedback message indicating feedback associated with the second message. The operations of 1725 may be performed in accordance with examples as disclosed herein. In some examples, aspects of the operations of 1725 may be performed by a feedback component 835 as described with reference to FIG. 8.

At 1730, the method may include transmitting one or more additional feedback messages indicating the feedback associated with the second message, where the one or more additional feedback messages include one or more retransmissions of the feedback message. The operations of 1730 may be performed in accordance with examples as disclosed herein. In some examples, aspects of the operations of 1730 may be performed by a feedback component 835 as described with reference to FIG. 8.

Figure 18:
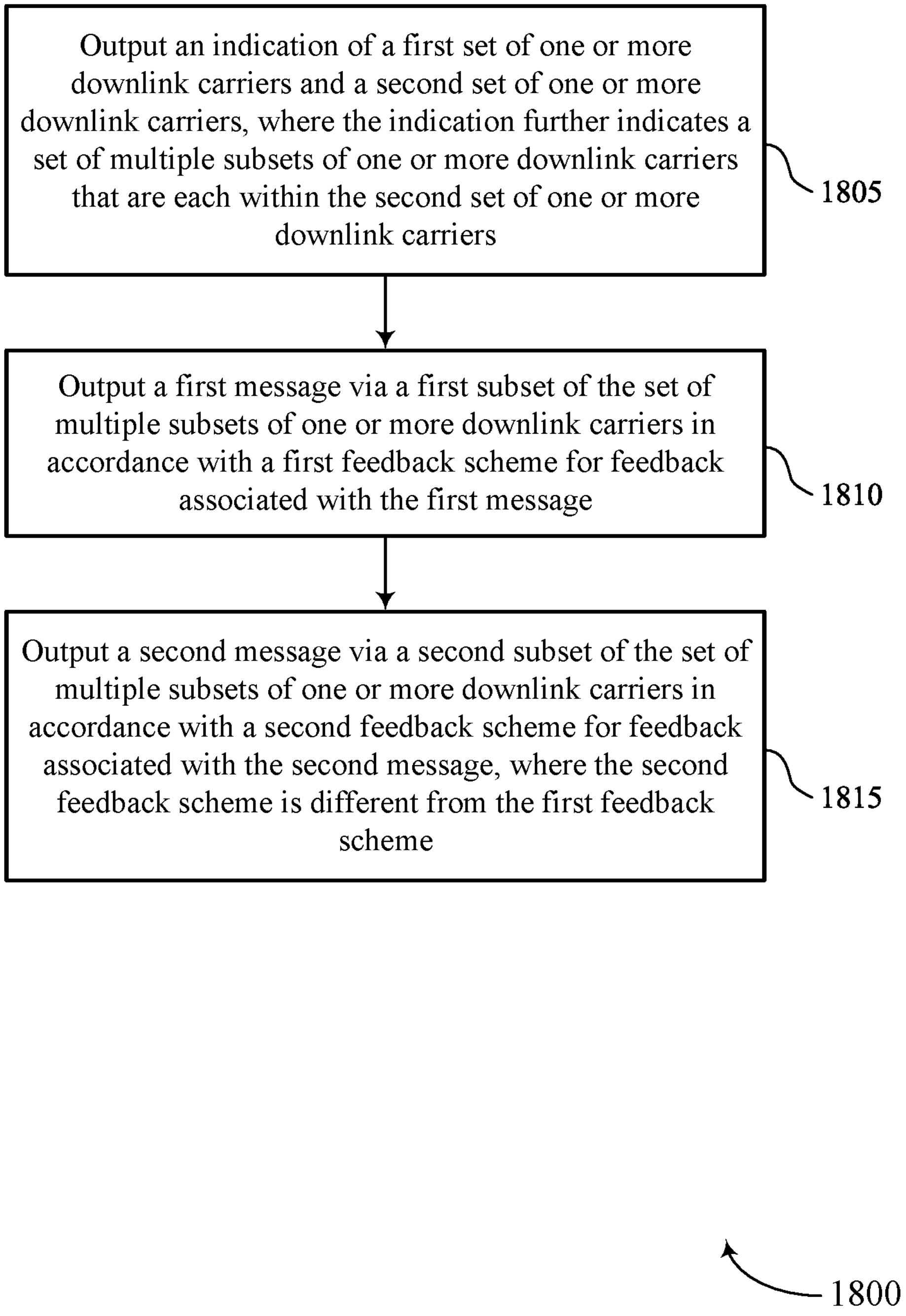

FIG. 18 shows a flowchart illustrating a method 1800 that supports feedback enhancements for multi-carrier operation in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include outputting an indication of a first set of one or more downlink carriers and a second set of one or more downlink carriers, where the indication further indicates a set of multiple subsets of one or more downlink carriers that are each within the second set of one or more downlink carriers. The operations of 1805 may be performed in accordance with examples as disclosed herein. In some examples, aspects of the operations of 1805 may be performed by a carrier set component 1225 as described with reference to FIG. 12.

At 1810, the method may include outputting a first message via a first subset of the set of multiple subsets of one or more downlink carriers in accordance with a first feedback scheme for feedback associated with the first message. The operations of 1810 may be performed in accordance with examples as disclosed herein. In some examples, aspects of the operations of 1810 may be performed by a message component 1230 as described with reference to FIG. 12.

At 1815, the method may include outputting a second message via a second subset of the set of multiple subsets of one or more downlink carriers in accordance with a second feedback scheme for feedback associated with the second message, where the second feedback scheme is different from the first feedback scheme. The operations of 1815 may be performed in accordance with examples as disclosed herein. In some examples, aspects of the operations of 1815 may be performed by a message component 1230 as described with reference to FIG. 12.

The following provides an overview of aspects of the present disclosure:

Aspect 1: A method for wireless communications by a UE, comprising: receiving an indication of a first set of one or more downlink carriers and a second set of one or more downlink carriers, wherein the indication further indicates a plurality of subsets of one or more downlink carriers that are each within the second set of one or more downlink carriers; receiving a first message via a first subset of the plurality of subsets of one or more downlink carriers; applying a first feedback scheme for feedback associated with the first message, wherein the first feedback scheme is applied based on the first message being received via the first subset; receiving a second message via a second subset of the plurality of subsets of one or more downlink carriers; and applying a second feedback scheme for feedback associated with the second message, wherein the second feedback scheme is applied based on the second message being received via the second subset, and wherein the second feedback scheme is different from the first feedback scheme.

Aspect 2: The method of aspect 1, wherein a feedback process duration associated with the second feedback scheme is less than a corresponding duration associated with the first feedback scheme.

Aspect 3: The method of any of aspects 1 through 2, wherein applying the first feedback scheme comprises: transmitting a feedback message indicating feedback associated with the first message, wherein the indication, the first message, and the second message are received from a first network entity, and wherein the feedback message is transmitted to a second network different from the first network entity.

Aspect 4: The method of aspect 3, wherein the feedback message indicates feedback associated with one or more additional messages received via the first subset of the plurality of subsets of one or more downlink carriers and is transmitted based at least in part on receiving a trigger message.

Aspect 5: The method of any of aspects 3 through 4, wherein the feedback message is transmitted via an anchor carrier associated with the first set of one or more downlink carriers.

Aspect 6: The method of any of aspects 3 through 5, wherein the feedback message indicates feedback associated with a plurality of retransmissions of the first message.

Aspect 7: The method of any of aspects 3 through 6, wherein the feedback message comprises one or more CRC bits.

Aspect 8: The method of any of aspects 3 through 7, wherein the feedback message indicates an identifier of the first network entity from which the first message is received.

Aspect 9: The method of any of aspects 3 through 8, wherein one or more RLC retransmissions are disabled.

Aspect 10: The method of any of aspects 3 through 9, further comprising: combining one or more log-likelihood ratio values associated with one or more retransmissions of the first message.

Aspect 11: The method of any of aspects 1 through 10, wherein applying the second feedback scheme comprises: monitoring the second subset of the plurality of subsets of one or more downlink carriers for one or more additional messages, wherein the one or more additional messages comprise one or more retransmissions of the second message, wherein the one or more retransmissions are due, at least in part, to an absence of feedback reporting in the second feedback scheme.

Aspect 12: The method of any of aspects 1 through 11, wherein applying the second feedback scheme comprises: transmitting a feedback message indicating feedback associated with the second message; and transmitting one or more additional feedback messages indicating the feedback associated with the second message, wherein the one or more additional feedback messages comprise one or more retransmissions of the feedback message.

Aspect 13: The method of aspect 12, wherein the feedback message and the one or more additional feedback messages are transmitted via an anchor carrier associated with the second set of one or more downlink carriers.

Aspect 14: The method of any of aspects 1 through 13, wherein applying the first feedback scheme and the second feedback scheme comprises: transmitting one or more first feedback messages indicating feedback associated with the first message, wherein the one or more first feedback messages are transmitted via an anchor carrier associated with the first set of one or more downlink carriers and in accordance with a first codebook and the first feedback scheme; and transmitting one or more second feedback messages indicating feedback associated with the second message, wherein the one or more second feedback messages are transmitted via an anchor carrier associated with the second set of one or more downlink carriers and in accordance with a second codebook and the second feedback scheme.

Aspect 15: The method of any of aspects 1 through 14, further comprising: transmitting an RLC status indicator associated with the first set, the first subset, the second subset, or any combination thereof.

Aspect 16: The method of any of aspects 1 through 15, wherein the first feedback scheme is applied for feedback that pertains to messages received via the first set of one or more downlink carriers.

Aspect 17: The method of any of aspects 1 through 16, wherein the first set of one or more downlink carriers and the second set of one or more downlink carriers are grouped based at least in part on a respective cell group, a respective uplink control channel group, one or more respective frequency bands, one or more respective subcarrier spacings, one or more respective bandwidths, one or more respective processing timelines, or any combination thereof, of each downlink carrier of the first set and the second set.

Aspect 18: The method of any of aspects 1 through 17, wherein the first subset within the second set of one or more downlink carriers and the second subset within the second set of one or more downlink carriers are grouped based on a respective cell index, a respective feedback process identifier, a respective logical channel, a respective logical channel group, or any combination thereof, of each downlink carrier of the first set and the second set.

Aspect 19: A method for wireless communications by network entity, comprising: outputting an indication of a first set of one or more downlink carriers and a second set of one or more downlink carriers, wherein the indication further indicates a plurality of subsets of one or more downlink carriers that are each within the second set of one or more downlink carriers; outputting a first message via a first subset of the plurality of subsets of one or more downlink carriers in accordance with a first feedback scheme for feedback associated with the first message; and outputting a second message via a second subset of the plurality of subsets of one or more downlink carriers in accordance with a second feedback scheme for feedback associated with the second message, wherein the second feedback scheme is different from the first feedback scheme.

Aspect 20: The method of aspect 19, wherein a feedback process duration associated with the second feedback scheme is less than a corresponding duration associated with the first feedback scheme.

Aspect 21: The method of any of aspects 19 through 20, further comprising: obtaining, based at least in part on the first feedback scheme, a feedback message indicating feedback associated with the first message, wherein the feedback message is obtained from a second network entity different from the network entity.

Aspect 22: The method of aspect 21, wherein the feedback message indicates feedback associated with one or more additional messages output via the first subset of the plurality of subsets of one or more downlink carriers and is obtained based at least in part on outputting a trigger message.

Aspect 23: The method of any of aspects 21 through 22, wherein the feedback message indicates feedback associated with a plurality of retransmissions of the first message.

Aspect 24: The method of any of aspects 21 through 23, wherein the feedback message comprises one or more CRC bits.

Aspect 25: The method of any of aspects 21 through 24, wherein the feedback message indicates an identifier of the network entity.

Aspect 26: The method of any of aspects 21 through 25, wherein one or more RLC retransmissions are disabled.

Aspect 27: The method of any of aspects 19 through 26, further comprising: outputting, based at least in part on the second feedback scheme, one or more additional messages via the second subset of the plurality of subsets of one or more downlink carriers, wherein the one or more additional messages comprise one or more retransmissions of the second message, wherein the one or more retransmissions are due, at least in part, to an absence of feedback reporting in the second feedback scheme.

Aspect 28: The method of any of aspects 19 through 27, further comprising: obtaining a feedback message indicating feedback associated with the second message; and obtaining one or more additional feedback messages indicating the feedback associated with the second message, wherein the one or more additional feedback messages comprise one or more retransmissions of the feedback message.

Aspect 29: The method of any of aspects 19 through 28, further comprising: obtaining one or more first feedback messages indicating feedback associated with the first message, wherein the one or more first feedback messages are associated with a first codebook and are obtained in accordance with the first feedback scheme; and obtaining one or more second feedback messages indicating feedback associated with the second message, wherein the one or more second feedback messages are associated with a second codebook and are obtained in accordance with the second feedback scheme.

Aspect 30: The method of any of aspects 19 through 29, further comprising: obtaining an RLC status indicator associated with the first set, the first subset, the second subset, or any combination thereof.

Aspect 31: The method of any of aspects 19 through 30, wherein the first feedback scheme is applied for feedback that pertains to messages output via the first set of one or more downlink carriers.

Aspect 32: The method of any of aspects 19 through 31, wherein the first set of one or more downlink carriers and the second set of one or more downlink carriers are grouped based at least in part on a respective cell group, a respective uplink control channel group, one or more respective frequency bands, one or more respective subcarrier spacings, one or more respective bandwidths, one or more respective processing timelines, or any combination thereof, of each downlink carrier of the first set and the second set.

Aspect 33: The method of any of aspects 19 through 32, wherein the first subset within the second set of one or more downlink carriers and the second subset within the second set of one or more downlink carriers are grouped based on a respective cell index, a respective feedback process identifier, a respective logical channel, a respective logical channel group, or any combination thereof, of each downlink carrier of the first set and the second set.

Aspect 34: A UE for wireless communications, comprising one or more memories storing processor-executable code, and one or more processors coupled with the one or more memories and individually or collectively operable to execute the code to cause the UE to perform a method of any of aspects 1 through 18.

Aspect 35: A UE for wireless communications, comprising at least one means for performing a method of any of aspects 1 through 18.

Aspect 36: A non-transitory computer-readable medium storing code for wireless communications, the code comprising instructions executable by one or more processors to perform a method of any of aspects 1 through 18.

Aspect 37: A network entity for wireless communications, comprising one or more memories storing processor-executable code, and one or more processors coupled with the one or more memories and individually or collectively operable to execute the code to cause the network entity to perform a method of any of aspects 19 through 33.

Aspect 38: A network entity for wireless communications, comprising at least one means for performing a method of any of aspects 19 through 33.

Aspect 39: A non-transitory computer-readable medium storing code for wireless communications, the code comprising instructions executable by one or more processors to perform a method of any of aspects 19 through 33.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive an indication of a first set of one or more downlink carriers and a second set of one or more downlink carriers, wherein the indication further indicates a plurality of subsets of one or more downlink carriers that are each within the second set of one or more downlink carriers;

receive a first message via a first subset of the plurality of subsets of one or more downlink carriers;

apply a first feedback scheme for feedback associated with the first message, wherein the first feedback scheme is applied based on the first message being received via the first subset;

receive a second message via a second subset of the plurality of subsets of one or more downlink carriers; and apply a second feedback scheme for feedback associated with the second message, wherein the second feedback scheme is applied based on the second message being received via the second subset, wherein the second feedback scheme is different from the first feedback scheme, wherein the first feedback scheme corresponds to a first signaling procedure for transmitting feedback and the second feedback scheme corresponds to a second signaling procedure for transmitting feedback, and wherein a feedback process duration associated with the second feedback scheme and a second backhaul latency is less than a corresponding duration associated with the first feedback scheme and a first backhaul latency.

2. The UE of claim 1, wherein, to apply the first feedback scheme, the one or more processors are individually or collectively operable to execute the code to cause the UE to: transmit a feedback message indicating feedback associated with the first message, wherein the indication, the first message, and the second message are received from a first network entity, and wherein the feedback message is transmitted to a second network different from the first network entity.

3. The UE of claim 2, wherein the feedback message indicates feedback associated with one or more additional messages received via the first subset of the plurality of subsets of one or more downlink carriers and is transmitted based at least in part on receiving a trigger message.

4. The UE of claim 2, wherein the feedback message is transmitted via an anchor carrier associated with the first set of one or more downlink carriers.

5. The UE of claim 2, wherein the feedback message indicates feedback associated with a plurality of retransmissions of the first message.

6. The UE of claim 2, wherein the feedback message comprises one or more cyclic redundancy check bits.

7. The UE of claim 2, wherein the feedback message indicates an identifier of the first network entity from which the first message is received.

8. The UE of claim 2, wherein one or more radio link control retransmissions are disabled.

9. The UE of claim 2, wherein the one or more processors are individually or collectively further operable to execute the code to cause the UE to:

combine one or more log-likelihood ratio values associated with one or more retransmissions of the first message.

10. The UE of claim 1, wherein, to apply the second feedback scheme, the one or more processors are individually or collectively operable to execute the code to cause the UE to:

monitor the second subset of the plurality of subsets of one or more downlink carriers for one or more additional messages, wherein the one or more additional messages comprise one or more retransmissions of the second message, wherein the one or more retransmissions are due, at least in part, to an absence of feedback reporting in the second feedback scheme.

11. The UE of claim 1, wherein, to apply the second feedback scheme, the one or more processors are individually or collectively operable to execute the code to cause the UE to:

transmit a feedback message indicating feedback associated with the second message; and transmit one or more additional feedback messages indicating the feedback associated with the second message, wherein the one or more additional feedback messages comprise one or more retransmissions of the feedback message.

12. The UE of claim 11, wherein the feedback message and the one or more additional feedback messages are transmitted via an anchor carrier associated with the second set of one or more downlink carriers.

13. The UE of claim 1, wherein, to apply the first feedback scheme and the second feedback scheme, the one or more processors are individually or collectively operable to execute the code to cause the UE to:

transmit one or more first feedback messages indicating feedback associated with the first message, wherein the one or more first feedback messages are transmitted via an anchor carrier associated with the first set of one or more downlink carriers and in accordance with a first codebook and the first feedback scheme; and transmit one or more second feedback messages indicating feedback associated with the second message, wherein the one or more second feedback messages are transmitted via an anchor carrier associated with the second set of one or more downlink carriers and in accordance with a second codebook and the second feedback scheme.

14. The UE of claim 1, wherein the one or more processors are individually or collectively further operable to execute the code to cause the UE to:

transmit a radio link control status indicator associated with the first set, the first subset, the second subset, or any combination thereof.

15. The UE of claim 1, wherein the first feedback scheme is applied for feedback that pertains to messages received via the first set of one or more downlink carriers.

16. The UE of claim 1, wherein the first set of one or more downlink carriers and the second set of one or more downlink carriers are grouped based at least in part on a respective cell group, a respective uplink control channel group, one or more respective frequency bands, one or more respective subcarrier spacings, one or more respective bandwidths, one or more respective processing timelines, or any combination thereof, of each downlink carrier of the first set and the second set.

17. The UE of claim 1, wherein the first subset within the second set of one or more downlink carriers and the second subset within the second set of one or more downlink carriers are grouped based on a respective cell index, a respective feedback process identifier, a respective logical channel, a respective logical channel group, or any combination thereof, of each downlink carrier of the first set and the second set.

18. A network entity, comprising:

one or more memories storing processor-executable code; and one or more processors coupled with the one or more memories and individually or collectively operable to execute the code to cause the network entity to:

output an indication of a first set of one or more downlink carriers and a second set of one or more downlink carriers, wherein the indication further indicates a plurality of subsets of one or more downlink carriers that are each within the second set of one or more downlink carriers;

output a first message via a first subset of the plurality of subsets of one or more downlink carriers in accordance with a first feedback scheme for feedback associated with the first message; and output a second message via a second subset of the plurality of subsets of one or more downlink carriers in accordance with a second feedback scheme for feedback associated with the second message, wherein the second feedback scheme is different from the first feedback scheme, wherein the first feedback scheme corresponds to a first signaling procedure for transmitting feedback and the second feedback scheme corresponds to a second signaling procedure for transmitting feedback, and wherein a feedback process duration associated with the second feedback scheme and a second backhaul latency is less than a corresponding duration associated with the first feedback scheme and a first backhaul latency.

* * * * *